US012533179B2

(12) United States Patent
Efimov et al.

(10) Patent No.: US 12,533,179 B2
(45) Date of Patent: Jan. 27, 2026

(54) HIGH RESOLUTION MULTI-FUNCTION AND CONFORMAL ELECTRONICS DEVICE FOR DIAGNOSIS AND TREATMENT OF CARDIAC ARRHYTHMIAS

(71) Applicant: The George Washington University, Washington, DC (US)

(72) Inventors: Igor R. Efimov, Washington, DC (US); Kedar Aras, Washington, DC (US); John A. Rogers, Evanston, IL (US); Erdit Gremi, Washington, DC (US); David Pospisil, Brno (CZ)

(73) Assignees: The George Washington University, Washington, DC (US); Northwestern University, Evanston, IL (US)

( * ) Notice: Subject to any disclaimer, the term of this patent is extended or adjusted under 35 U.S.C. 154(b) by 702 days.

(21) Appl. No.: 15/886,673

(22) Filed: Feb. 1, 2018

(65) Prior Publication Data
US 2018/0235692 A1 Aug. 23, 2018

Related U.S. Application Data

(60) Provisional application No. 62/528,758, filed on Jul. 5, 2017, provisional application No. 62/453,184, filed on Feb. 1, 2017.

(51) Int. Cl.
*A61B 18/14* (2006.01)
*A61B 5/00* (2006.01)
(Continued)

(52) U.S. Cl.
CPC ........ *A61B 18/1492* (2013.01); *A61B 5/0538* (2013.01); *A61B 5/1107* (2013.01);
(Continued)

(58) Field of Classification Search
CPC . A61B 18/1492; A61B 5/0538; A61B 5/1107; A61B 5/686; A61B 5/6869;
(Continued)

(56) References Cited

U.S. PATENT DOCUMENTS 5,769,846 A 6/1998 Edwards et al.
2008/0306394 A1* 12/2008 Zdeblick ............ A61B 5/04011
600/509

(Continued)

OTHER PUBLICATIONS

Prof. Dr. Hyun-Joong Chung, et al., "Ultrathin, Stretchable, Multiplexing pH Sensor Arrays on Biomedical Devices with Demonstrations on Rabbitt and Human Hearts Undergoing Ischemia", Adv. Healthc Mater . . . Jan. 2014; vol. 3, No. 1, pp. 1-20.
(Continued)

*Primary Examiner* — Eun Hwa Kim
*Assistant Examiner* — Catherine Premraj
(74) *Attorney, Agent, or Firm* — BLANK ROME LL[P

(57) ABSTRACT

The present invention is a high resolution, multi-function, conformal electronics device generally having a flexible and stretchable, high-density electrode array, integrated with a catheter (e.g., balloon catheter) for mapping, ablating, pacing and sensing of cardia tissue associated with heart arrhythmias. The active sensing electrode array can acquire diagnostic information including electrical (e.g., electrograms), mechanical (e.g., strain measurements), impedance (e.g., resistance), metabolic (e.g., pH or NADH measurement) from the underlying heart tissue surface with which it is in contact. The electrode array may be designed to be of various sizes and shapes to conform to the targeted cardiac tissue architecture (e.g. atrial, ventricle, right ventricular outflow tract, coronary sinus, pulmonary veins, etc.) corresponding to the specific type of cardiac arrhythmia. The present invention can precisely locate the source of arrhythmia as described above and deliver therapy from the same
(Continued)

electrode array. This is achieved using a capacitive sensing electrode array that can not only monitor but also deliver electrical stimulation.

22 Claims, 14 Drawing Sheets

(51) Int. Cl.
| | |
|---|---|
| *A61B 5/0538* | (2021.01) |
| *A61B 5/11* | (2006.01) |
| *A61N 1/05* | (2006.01) |
| *A61B 5/145* | (2006.01) |
| *A61B 17/00* | (2006.01) |
| *A61B 18/00* | (2006.01) |
| *A61B 18/02* | (2006.01) |
| *A61N 1/362* | (2006.01) |

(52) U.S. Cl.
CPC ........... *A61B 5/686* (2013.01); *A61B 5/6869* (2013.01); *A61N 1/056* (2013.01); *A61B 5/14539* (2013.01); *A61B 2017/00053* (2013.01); *A61B 2018/0016* (2013.01); *A61B 2018/00214* (2013.01); *A61B 2018/0022* (2013.01); *A61B 2018/00267* (2013.01); *A61B 2018/00357* (2013.01); *A61B 2018/00577* (2013.01); *A61B 2018/00797* (2013.01); *A61B 2018/00839* (2013.01); *A61B 2018/00875* (2013.01); *A61B 2018/0212* (2013.01); *A61B 2562/0209* (2013.01); *A61B 2562/04* (2013.01); *A61B 2562/046* (2013.01); *A61B 2562/164* (2013.01); *A61N 2001/058* (2013.01); *A61N 2001/0585* (2013.01); *A61N 1/362* (2013.01); *A61N 1/3627* (2013.01)

(58) Field of Classification Search
CPC ...... A61B 5/14539; A61B 2017/00053; A61B 2018/0016; A61B 2018/00214; A61B 2018/0022; A61B 2018/00267; A61B 2018/00357; A61B 2018/00557; A61B 2018/00797; A61B 2018/00839; A61B 2018/00875; A61B 2018/0212; A61B 2562/0209; A61B 2562/04; A61B 2562/046; A61B 2562/164; A61N 1/056; A61N 1/362; A61N 1/3627; A61N 2001/058; A61N 2001/0585
See application file for complete search history.

(56) References Cited

U.S. PATENT DOCUMENTS

| | | |
|---|---|---|
| 2009/0131930 A1 | 5/2009 | Gelbart et al. |
| 2010/0087782 A1* | 4/2010 | Ghaffari ............... A61B 1/3137 604/103.01 |
| 2011/0034912 A1* | 2/2011 | de Graff ........... H01L 27/14632 606/41 |
| 2011/0224665 A1* | 9/2011 | Crosby ................... A61N 1/06 606/33 |
| 2012/0157804 A1 | 6/2012 | Rogers et al. |
| 2013/0041235 A1 | 2/2013 | Rogers et al. |
| 2014/0058197 A1* | 2/2014 | Salahieh ................ A61B 1/05 600/109 |
| 2014/0088442 A1* | 3/2014 | Soykan ............... A61B 5/6866 600/483 |
| 2015/0141767 A1* | 5/2015 | Rogers ................ A61B 5/6885 600/361 |
| 2015/0173673 A1 | 6/2015 | Toth et al. |
| 2016/0106376 A1 | 4/2016 | Li et al. |

OTHER PUBLICATIONS

L. Xu, et al., "3D Multifunctional Integumentary Membranes for Spatiotemporal Cardiac Measurements and Stimulation Across the Entire Epicardium", Nature Communications, www.nature.com/naturecommunications; Feb. 25, 2014; pp. 1-10.
L. Xu, et al., "Materials and Fractal Designs for 3D Multifunctional Integumentary Membranes with Capabilities in Cardiac Electrotherapy", Advanced Materials; www.MaterialsViews.com; 2015; vol. 27; pp. 1731-1737.
Dr. Ahyeon Koh, et al., "Ultrathin Injectable Sensors of Temperature, Thermal Conductivity, and Heat Capacity for Cardiac Ablation Monitoring", Adv. Health Mater., Feb. 4, 2016; vol. 5, No. 3, pp. 1-19.
H. Fang, et al., "Capacitively Coupled Arrays of Multiplexed Flexible Silicon Transistors for Long-Term Cardiac Electrophysiology", Nature Biomedical Engineering, www.nature.com/natbiomedeng; Mar. 2017; vol. 1, No. 0038; pp. 1-12.
J. G. McCall, et al., "Fabrication and Application of Flexible, Multimodal Light-Emitting Devices for Wireless Optogenetics", Nature Protocols; vol. 8, No. 12; Nov. 7, 2013; pp. 2413-2428.
EP Communication for EP Application No. 18748590.9, dated Dec. 12, 2020, 1 pg.
EP Search Report for EP Application No. 18748590.0, dated Nov. 12, 2020, 4 pgs.
S. P. Lee, et al., "Catheter-Based Systems with Integrated Stretchable Sensors and Conductors in Cardiac Electrophysiology", Proceedings of the IEEE, vol. 103, No. 4, Apr. 2015, pp. 682-689.
International Search Report & Written Opinion for PCT/US2018/16499, dated Apr. 12, 2018, 11 pgs.
"High Definition Conformal Electronics Patent Description", 35 pgs.

* cited by examiner

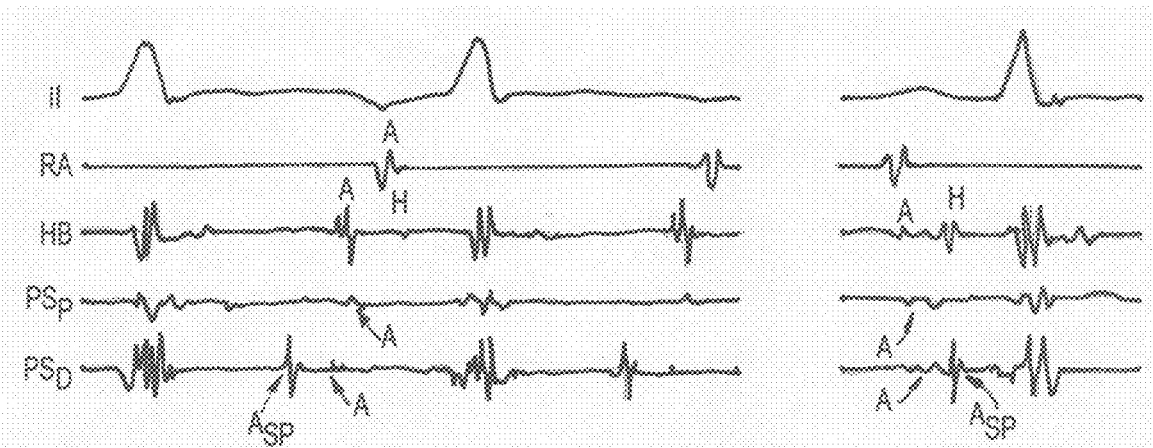
FIG. 4A  FIG. 4B
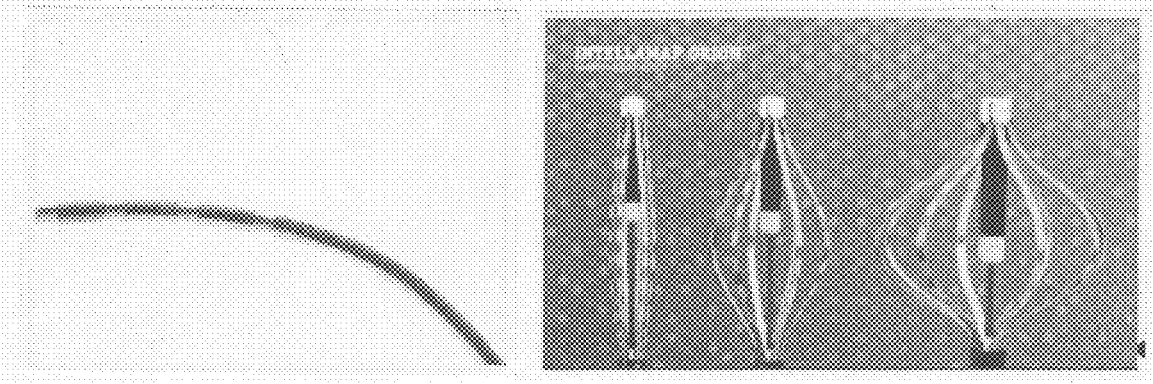
FIG. 5A
(PRIOR ART)
FIG. 5B
(PRIOR ART)
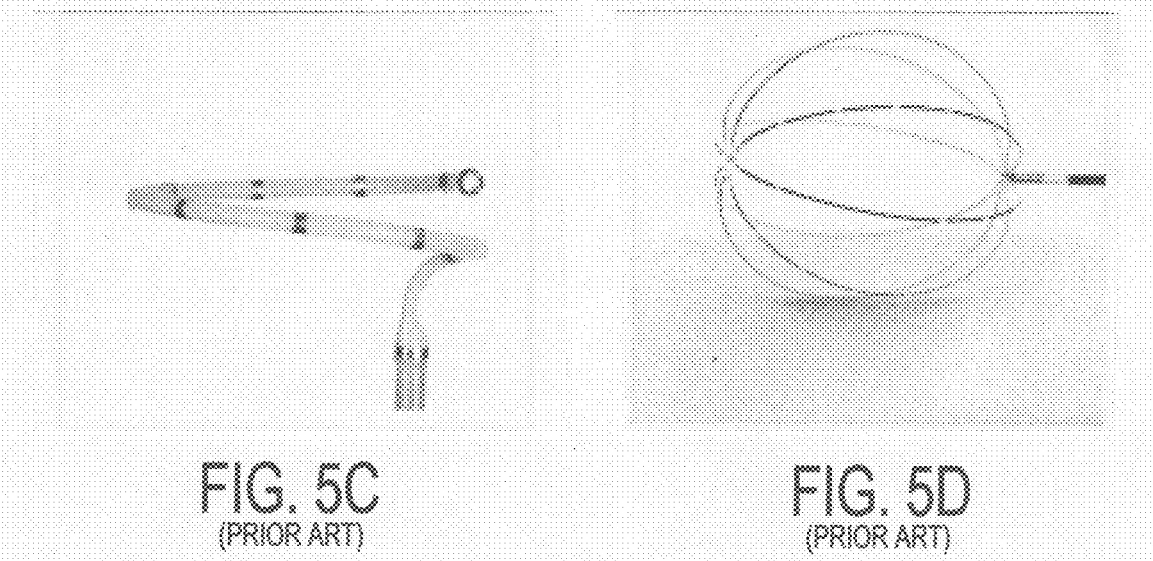
FIG. 5C
(PRIOR ART)
FIG. 5D
(PRIOR ART)

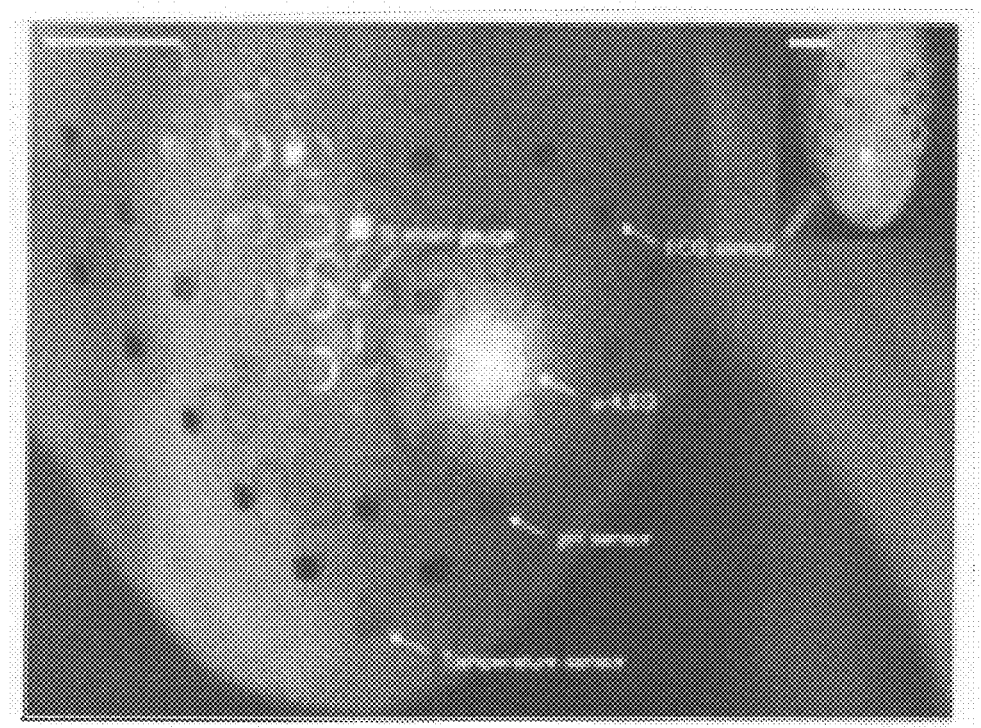
FIG. 6
FIG. 7A
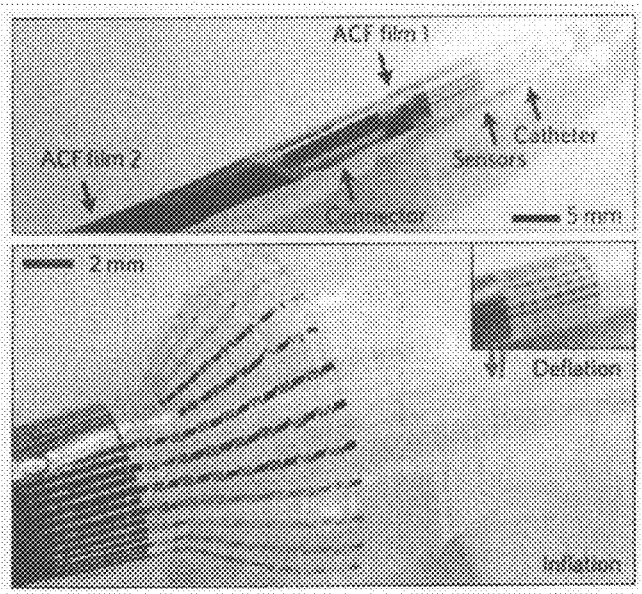
FIG. 7B

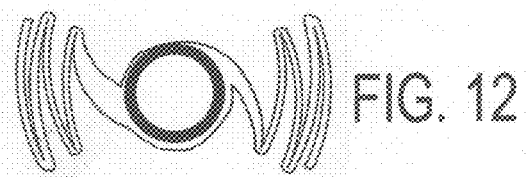
FIG. 12
FIG. 13A
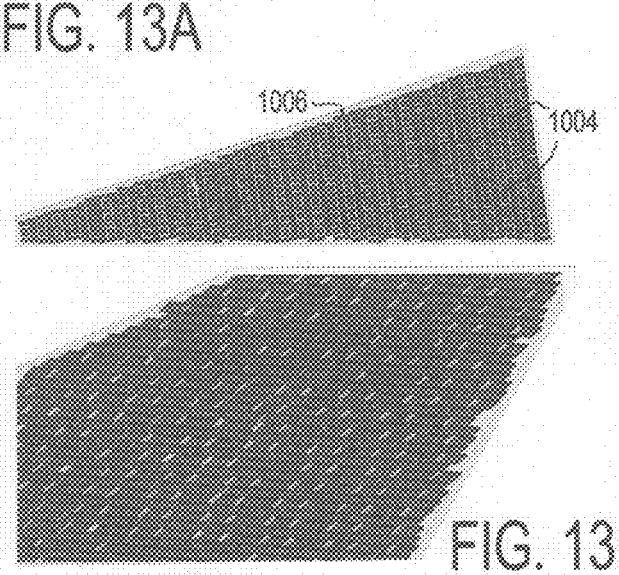
FIG. 13B
FIG. 13C
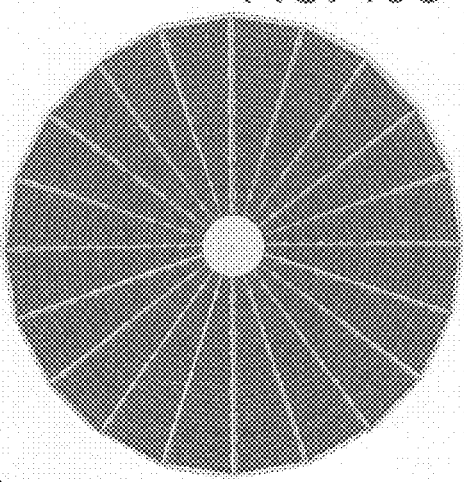
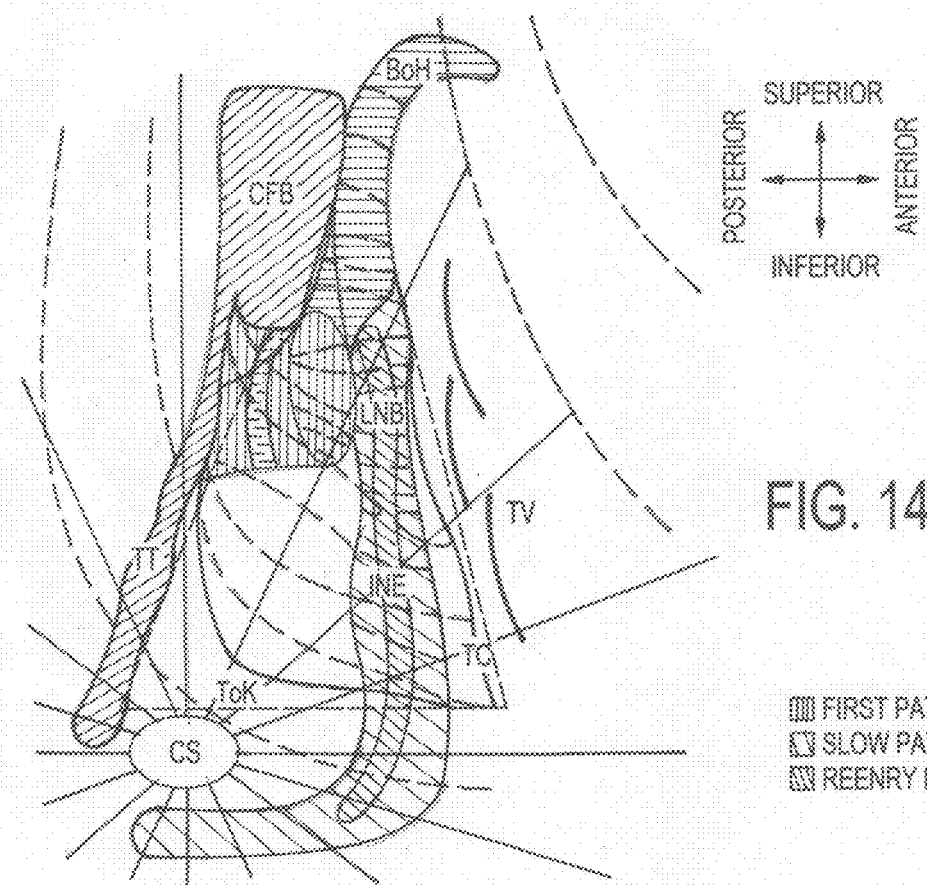
FIG. 14

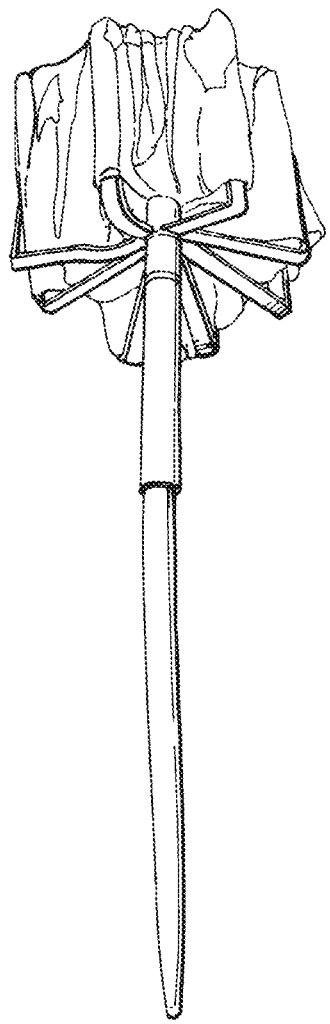
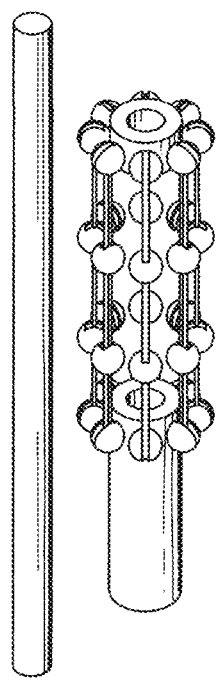
FIG. 24A
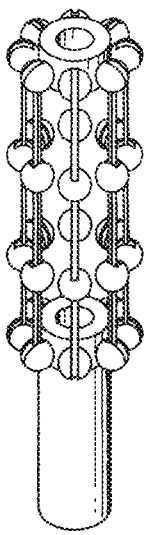
FIG. 24B
FIG. 23
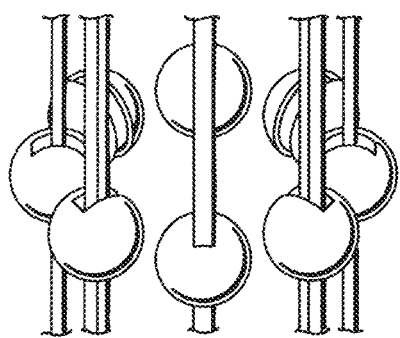
FIG. 24C
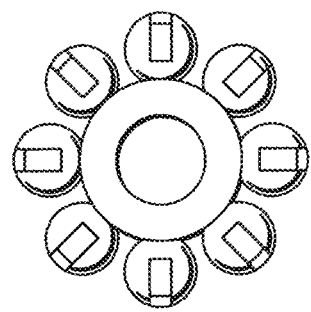
FIG. 24D

HIGH RESOLUTION MULTI-FUNCTION AND CONFORMAL ELECTRONICS DEVICE FOR DIAGNOSIS AND TREATMENT OF CARDIAC ARRHYTHMIAS

RELATED APPLICATIONS

This application claims the benefit of U.S. Provisional Application Nos. 62/453,184 and 62/528,758, filed Feb. 1, 2017 and Jul. 5, 2017, respectively, the entire contents of which are incorporated herein by reference.

GOVERNMENT LICENSE RIGHTS

This invention was made with government support under grant nos. R01 HL115415 and R01 HL114395 awarded by the National Institutes of Health. The government has certain rights in the invention.

BACKGROUND OF THE INVENTION

Field of the Invention

The present invention relates to devices for the treatment of arrhythmias. More particularly, the present invention relates to a multifunctional catheter device for the real time diagnosis and treatment of cardiac arrhythmias.

Background of the Related Art

An arrhythmia is a disorder with the speed or rhythm of the heartbeat. Aberrant conductive pathways disrupt the normal path of the heart's electrical impulses. For example, conduction blocks can cause the electrical impulse to degenerate into circular "reentrant" wavelets that disrupt the normal activation of the atria or ventricles. In patients with cardiac arrhythmias, abnormal regions of cardiac tissue do not follow the synchronous beating cycle associated with normally conductive tissue in patients with sinus rhythm. Instead, the abnormal regions of cardiac tissue aberrantly conduct to adjacent tissue, thereby disrupting the cardiac cycle into an asynchronous cardiac activity.

Such abnormal conduction has been previously known to occur at various regions of the heart including the left and right atria (atrial fibrillation) including, for example, in the region of the sino-atrial (SA) node, along the conduction pathways of the atrioventricular node (AVN) and the Bundle of His (BoH) or in the cardiac muscle tissue forming the walls of the ventricular (e.g. VF) and atrial (e.g., AF) cardiac chambers. Atrioventricular nodal reentrant tachycardia (AVNRT) is a type of abnormal fast heart rhythm, which occurs when a reentry circuit forms within or just next to the AVN. It is a type of supraventricular tachycardia (SVT), which is defined as an arrhythmia that originates from a location within the heart above the BoH. On the other hand, right ventricular outflow tract (RVOT) tachycardia is called ventricular tachycardia as it occurs when the reentrant circuit or focal activity develops in the RVOT region. The Purkinje fibers in the ventricles are also known to contribute to ventricular tachyarrhythmias, including ventricular tachycardia (VT) and ventricular fibrillation (VF). FIG. 1A is an image of the human RVOT region, and FIGS. 1B and 1C are images of the human atrioventricular junction (AVJ).

Anatomy

The AVN is located in the paraseptal endocardium of the right atrium (RA), at the apex of the Triangle of Koch (ToK), formed by the ostium of the coronary sinus (CS), the tendon of Todaro (TT), and the tricuspid valve (TV). The AVN can further be categorized into the lower nodal bundle (LNB) and compact node (CN). From the LNB, the rightward inferior nodal extension (INE) spreads along the atrial annulus of the TV towards the CS and the leftward nodal extension spreads from the CN along the TT. The RVOT is the area of the right ventricle situated just underneath the pulmonary valve, which is the main outflow valve on the right side of the heart. It is the most common site for idiopathic (cause unknown) ventricular tachycardia in patients with normal hearts. Purkinje fibers are located along the endocardium (inner most layer) of the right and left ventricles (RV and LV) and specialize in rapid conduction of electrical impulses.

Biochemical Anatomy

Electrical coupling between cells occurs via gap junctions, which create pores between neighboring myocytes and facilitate the electrical and chemical signals between them. The gap junctions are hexameric protein structures formed by connexins (Cx) and vary in conductance based on the Cx isoforms. The most commonly expressed isoforms in the AVN are Cx40 (which have large conductance) and Cx43 (medium conductance). The AVN has a distinct distribution of these connexin isoforms that promotes its physiological functions. Various studies have characterized total protein and mRNA levels of Cx40, and Cx43 qualitatively and quantitatively in the human AVN. Representative Cx43 immunolabeled sections are shown in FIG. 2B, alongside their serially sectioned histological images shown in FIG. 2A.

Atrial myocytes (AM) strongly express both Cx43 and Cx40 proteins and mRNA. The BoH, and Left Nodal Bundle (LNB) have both high Cx40 and Cx43 levels. Cx43 and Cx40 are also expressed in the proteins and mRNA of transitional cells (TC), but at lower levels. Conversely, the compact node, has elevated Cx40 expression but very low Cx43. The INE has high Cx43 expression but reduced Cx40. The expression profile for Cx43 in the human AVN is shown in FIG. 2C. Generally, Cx40 and Cx43 can be expressed in opposite levels in tissues of the AVN (high Cx43, means low Cx40 and vise-versa) except for the BoH and LNB, where they are both present in elevated levels.

Electrophysiology

Electrophysiological refractoriness defines the time interval after an action potential where the cell cannot be re-excited. Studies have shown that the tissues of the Slow Pathway (SP) have a shorter refractory period than those of the Fast Pathway (FP).

The AVN serves as the pathway for electrical excitation between the atria and ventricles. Due to its protein expression profiles, the conduction of electrical excitation is slow in the AVN relative to the working myocardium. There are also conduction velocity differences even within the compartments of the AVN. The tissue heterogeneities described above drive these differences and create the FP and SP pathways of AVN conduction. During a normal beat, atrial excitation occurs prior to AVN excitation as shown in FIG. 3B. The conduction wavefront moves through the AVN, anterogradely through both the FP and SP, as shown in FIG. 3C. The wave reaches the BoH earlier through the FP relative to the SP. BoH activation (FIG. 3D), then ventricular activation, occurs afterwards. Fast and Slow pathways do not refer to the conduction velocity through these structures. The terminology arises from the conduction delay through these structures. It takes longer for excitation to reach the BoH through the SP due to its larger anatomic length. Conversely, conduction velocity is slower through the FP but due to its significantly shorter length, excitation reaches the BoH first through this pathway.

Abnormal activation sequences or rhythms through this complex nodal structure can result in the development of a re-entrant rotor within the dual conduction pathway of the AVN. This then gives rise to arrhythmias such as AVNRT. A diagram of the AVN during an SP-FP AVNRT episode is shown in FIG. 3A, where the wavefront propagates retrogradely up the FP and then anterogradely through the SP.

The Slow/Fast AVNRT is the most typical type of AVNRT and occurs when a premature atrial complex (PAC) travels anterogradely down the SP (right inferior extension) between the Coronary Sinus ostium and the tricuspid annulus followed by retrograde conduction along the FP.

The Fast/Slow AVNRT is more atypical than the Slow/Fast AVNRT and occurs when antegrade conduction occurs down the Fast pathway and retrograde conduction occurs up the right inferior extension (Slow pathway) with the earliest atrial activation at the inferior septum. Occasionally, retrograde conduction occurs up the left inferior extension (leftward Slow pathway).

There is a third, but rare AVNRT type called Slow/Slow. In general, Slow/Slow AVNRT conduction occurs antegradely down the rightward inferior extension and retrogradely up the leftward inferior extension. The earliest retrograde atrial activation is therefore often the roof of the coronary sinus although it may also be between the coronary sinus and the tricuspid annulus if retrograde conduction occurs along the rightward inferior extension.

In summary, the pro-arrhythmic regions of the heart, including the Sino atrial node (SAN) and the atrioventricular junction in the atria as well as the Purkinje fibers in the ventricles, exhibit complex spatio-temporal differences in electrical morphologies (electrical signals vary not only in space but also in time). Moreover these regions are susceptible to triggering (initiating) arrhythmia.

FIG. 1A shows, from the top, a tracing from Lead II and ECGs recorded from the right atrial appendage (RA), the His-bundle region (HB), and the proximal (PSP) and distal (PSD) pairs of electrodes of the mapping catheter, positioned against the right atrium between the coronary-sinus ostium and the tricuspid annulus. During fast—slow AVNRT (FIG. 4A), retrograde conduction occurred over the slow pathway, and the earliest retrograde atrial potential was recorded from the PSD electrodes, which showed a small atrial potential (at A), nearly coincident with the atrial potentials in the PSP and HB ECGs. It was preceded by a large ASP potential (large arrow) recorded 60 msec before the onset of the P wave. During sinus rhythm (FIG. 4B), when the slow pathway was activated in the antegrade direction, the order of the two potentials in PSD was reversed, with the A potential still coincident with the other atrial potentials. The application of radio-frequency current at this site eliminated antegrade and retrograde slow-pathway conduction and both forms of AVNRT. H denotes His-bundle potential.

Clinical Practice

Ablation is one way of treating AVNRT and restoring normal electrical conduction and contraction. A cardiac ablation procedure begins with mapping the electrical activity of a treatment site prior to permanent ablation, in order to pinpoint appropriate ablation target sites. Some apparent target sites may not actually contribute to abnormal electrical activity, and treating such sites is not desirable because doing so may affect healthy tissue in undesirable ways (e.g., creating conduction blocks). The cardiac cell is typically 100-150 micron in length and 15-20 microns in width. Thus, precisely mapping the electrical activity in a target treatment region can help focus the treatment and confirm its efficacy and safety. A specialized catheter is used to electrically map cardiac tissue, such as a circular catheter. Such a mapping catheter is positioned at possible treatment sites inside a patient, and mapping electrodes at those sites can provide signals to a processing system external to the patient that can process the signals and provide physicians with information to subsequently provide therapy. Traditional mapping catheters gather electrical information about a single point on the endocardium.

A specialized catheter may be employed to electrically map tissue, such as a circular catheter. Such a mapping catheter can be positioned at possible treatment sites inside a patient, and electrodes at those sites can provide signals to a processing system external to the patient that can process the signals and provide physicians with information to subsequently provide an RF therapy from the same catheter that can deliver appropriately targeted ablation energy without the need to position other catheters into therapeutic position. After mapping, the physician may ablate the aberrant tissue. In RF ablation, RF energy is directed from the ablation electrode through tissue to an electrode to ablate the tissue and form a lesion. Upon the completion of the ablation procedure, the physician may choose to apply electrical energy to the region of interest so that the electrophysiological pacing of an aberrant heart region may be initiated. This pacing energy is supplied by another form of electrode catheter and is done to ensure that the ablation procedure has been successful in eliminating any aberrant electrical pathways in the cardiac tissue of interest. If the pacing electrode is successful in initiating an aberrant rhythm in the cardiac tissue, the physician may choose to further map and ablate the cardiac tissue until such aberrant rhythm can no longer be generated in the cardiac tissue. If the pacing electrode is not successful in initiating an aberrant rhythm in the cardiac tissue, the physician may conclude the ablation procedure.

Another way of treating arrhythmias and restoring normal contraction is through the use of implantable medical devices (IMDs) such as implantable pulse generators (IPGs) or implantable cardioverter defibrillators (ICDs). Conventionally, the pulse generator is implanted in a patient's pectoral region just under the skin. One or more epicardial or endocardial leads extend from the pulse generator and into chambers of the heart, most commonly into the right ventricle and the right atrium, although sometimes also into a vein over the left chambers of the heart. An electrode is at a far end of a lead and provides the electrical contact to the heart tissue for delivery of the electrical pulses generated by the pulse generator and delivered to the electrode through the lead. These implantable devices can detect and deliver therapy.

For example, electrodes on implantable leads may detect electrical signals within the patient, such as an electrocardiogram, in addition to delivering electrical stimulation to restore normal heart function.

After mapping, the physician may proceed to ablate the aberrant tissue. In radio-frequency (RF) ablation, RF energy is directed from the ablation electrode through tissue to an electrode to ablate the tissue and form a lesion. Radio-frequency current (550 to 750 kHz) is commonly delivered at 45 to 70 V between the catheter-tip electrode and an adhesive electrosurgical dispersive pad applied to the left posterior chest. Current is applied for 45 seconds or longer but is terminated immediately if there is an increase in impedance or displacement of the catheter electrode. Upon the completion of the ablation procedure, the physician applies electrical pacing rhythm to the region of interest so that the electrophysiological pacing of an aberrant heart may be initiated. This pacing energy is supplied by another catheter and is done to ensure that the ablation procedure has been successful in eliminating any aberrant electrical pathways in the cardiac tissue of interest. The most common way is through the introduction of atrial or ventricular pre-mature depolarization beats. Continuous burst pacing or rapid incremental pacing to 135% of the Tachycardia pace at 5V in the RA or the coronary sinus may induce the tachycardia.

If the pacing electrode is successful in initiating an arrhythmia in the cardiac tissue, the physician will further map and ablate the cardiac tissue until an arrhythmia can no longer be generated in the cardiac tissue. If the pacing electrode is not successful in initiating an aberrant rhythm in the cardiac tissue, the physician will conclude the ablation procedure. This process of using a mapping catheter to find the aberrant tissue, switching to an ablation catheter, using an ablation catheter to ablate tissue, switching to a pacing catheter, using the pacing catheter to generate another arrhythmia is time consuming and highly dependent on the skill of a trained physician.

Additionally, the repeated switching to different catheters introduces difficulty of targeting an exact location that has been mapped because the patient heart is beating and the motion introduces additional difficulty in precise operation. Further, mapping single points of the endocardium can extend the length of a procedure if the physician is not able to find the aberrant tissue or if the aberrant tissue is localized to a small area of the heart. Lastly, current clinical catheters have limited spatial resolution that affects the accuracy of precise tracking the arrhythmia sources for targeted ablation, especially when contiguous lines of ablation are needed. This often results in unsuccessful ablation treatment or recurrence of arrhythmia post ablation.

The current manifestations of devices used to diagnose, map and pace the electrical rhythms of the heard are limited in their specificity of function and their low spatial resolution in providing information to the physician.

Mapping catheters on the market are often designed as steerable and formable shafts with a single electrode on the distal end of the electrode shaft, or with multiple electrodes on the surface of the mapping catheter shaft in the distal region of the device to detect electrical signals of the desired tissue. The limited surface area of a thin catheter shaft inherently limits the number of electrodes that can be placed on its surface. This results in traditional mapping catheters with a low number of mapping electrodes with which to diagnose aberrant signal pathways in the tissue. FIG. 5A shows an electrode mapping catheter available from Boston Scientific Corporation, of Natick, Massachusetts 01760; FIG. 5B shows an Orion 64 electrode mapping catheter, also available from Boston Scientific; FIG. 5C shows an electrode mapping catheter available from Biosense Webster, Inc., of Irvine, California 92618; and FIG. 5D shows a 64 electrode mapping catheter, available from Abbot/St. Jude Medical, of St. Paul, Minnesota 55117.

New designs such as the FIRMap Catheter (FIG. 5D) by Abbott have a total of 64 evenly spaced electrodes (4 mm spatial resolution), distributed between 8 splines (8 electrodes per spline) in what is known as a basket catheter. The spline design facilitates deployment of electrodes across the chamber, thus providing more resolution for atrial endocardium mapping purposes. However, "whole chamber" mapping basket catheters cannot avoid spline bunching and influence coverage, which often results in interspline distances of 20 mm and consequently, less than 50% coverage of the LA/RA surface.

The design of pacing catheters is limited to a single pacing electrode on the distal end of an electrode shaft to be applied separately from the mapping catheter during the diagnostic procedure. Similarly to mapping catheters, RF ablation catheters on the market are often designed as steerable and formable shafts with a single ablation electrode on the distal end of the electrode shaft, or with multiple ablation electrodes on the surface of the mapping catheter shaft in the distal region of the ablation catheter to deliver the ablation energy to the desired tissue. The standard ablation catheter is 6 French (2 mm in diameter, 1 French is equal to ⅓ mm) and operates at anywhere from 0.3 W to 9.3 Watts. Lesion size is determined by contact length, and power delivery but is limited from 0 to 8.3 mm in diameter and is expected to occur when the tissue temperature is at 45° C. Ablation catheters may incorporate irrigation systems for the purpose of cooling the tissue that is adjacent to the location where ablation energy is being applied.

This is done in order to minimize the unintended ablation of tissue that is not causing the aberrant electrical pathway in the tissue and serves to "focus" ablation energy to the intended area.

An alternative to RF ablation is the use of cold temperature to create lesions in tissue. Cryoablation uses a balloon catheter inserted into a blood vessel, usually in the femoral vein, and then threads it though the body until it reaches the heart. This narrow tube has an inflatable balloon on the distal end that engages the pulmonary vein. Using imaging techniques, the doctor is able to guide the catheter to the heart. Once the balloon is in position at the tissue of interest, refrigerated fluid flows through the catheter to create the lesions in the tissue that eliminate the aberrant heart rhythm.

The cryoballoon allows for cryothermal application over a larger surface area than RF ablation procedures. Catheter manipulation and correct positioning of the ablation catheter remain key ingredients for a successful procedure both in terms of effectiveness and safety. Failure to fully provide therapy to the targeted tissue during cryoballoon lesion delivery is usually due to incomplete contact and leads to a lower chance of targeted tissue isolation and a higher risk of recurrence of aberrant heart rhythm.

The current manifestations of devices used to diagnose, map and pace the electrical rhythms of the heart are limited in their specificity of function and their low resolution in providing information to the physician. Mapping catheters on the market are often designed as steerable and formable shafts with a single electrode on the distal end of the electrode shaft, or with multiple electrodes on the surface of the mapping catheter shaft in the distal region of the to detect electrical signals of the desired tissue.

The limited surface area of a thin catheter shaft inherently limits the number given the limited number of leads available on the device. This results in traditional mapping catheters with a low number of mapping electrodes with which to diagnose aberrant signal pathways in the tissue. The design of pacing catheters is limited to a single pacing electrode on the distal end of an electrode shaft to be applied separately from the mapping catheter during the diagnostic procedure.

As such, the devices are unable to precisely locate the region of abnormal electrical activity to deliver electrical stimulation. Cardioversion and defibrillation therapy compensates for lack of precision in locating the source of abnormal conduction by delivering high voltage, high-energy shock to the entire heart to reset electrical activity and restore normal heart function. All the above limitations work together to increase cardiac tissue damage as well as the pain and emotional trauma experienced by the patient when subjected to high-energy electrical shock. Therefore, an unmet need exists in the field for a novel high-resolution electronics apparatus that can not only detect but also precisely locate the region of abnormal rhythm. A further unmet need exists for a multi-function device that can measure more than one parameter including electrical, mechanical, optical, metabolic, impedance, temperature, and the like. Finally, there is also a need for a flexible and stretchable electronics that can conform itself to an epicardial or endocardial surface along smooth and/or trabeculated regions to acquire precise measurements.

Flexible and Stretchable Electronics Technology

Physically pliable silicon-based electronics have been developed in that offer the ability to easily conform electrical circuits to the dynamic surface of a beating heart. Sub-millimeter and sub-millisecond resolution electrical recordings from cardiac tissue can be obtained using a matrix of sensors and transistors (see FIG. 6). Details of this technology can be found in U.S. Pub. Pat. Appln. No. 2015/0141767 A1 and the following publications, all of which are incorporated herein by reference in their entirety:

(1) Chung H J, Sulkin M S, Kim J S, Goudeseune C, Chao H Y, Song J W, Yang S U, Hsu Y Y, Ghaffari R, Efimov I R, Rogers J A. Ultrathin, Stretchable, Multiplexing pH Sensor Arrays on Biomedical Devices With Demonstrations on Rabbit and Human Hearts Undergoing Ischemia. Advanced Healthcare Materials. Biomaterials. 2014 January; 3(1): 59-68.

(2) Xu L, Gutbrod S R, Bonifas A P, Su Y, Sulkin M S, Lu N, Chung H J, Jang K I, Liu J, Ying M, Lu C, Webb R C, Kim J S, Laughner J I, Cheng H, Liu Y, Ameen A, Jeong J W, Kim G T, Huang Y, Efimov I R, Rogers J A. 3D multifunctional integumentary membranes for spatiotemporal cardiac measurements and stimulation across the entire epicardium. Nature Communications. 2014 Feb. 25; 5: 3329. PMID: 24569383.

(3) Xu L, Gutbrod S R, Ma Y, Petrossians A, Liu Y, Webb R C, Fan J A, Yang Z, Xu R, Whalen J J 3rd, Weiland J D, Huang Y, Efimov I R, Rogers J A. Materials and Fractal Designs for 3D Multifunctional Integumentary Membranes with Capabilities in Cardiac Electrotherapy. Adv Mater. 2015 Mar. 11; 27(10): 1731-7.

(4) Koh A, Gutbrod S R, Meyers J D, Lu C, Webb R C, Shin G, Li Y, Kang S K, Huang Y, Efimov I R, Rogers J A. Ultrathin Injectable Sensors of Temperature, Thermal Conductivity, and Heat Capacity for Cardiac Ablation Monitoring. Adv Healthc Mater. 2016 February; 5(3): 394, PMID: 26844681.

(5) Fang H, Yu K J, Gloschat C, Yang Z, Song E, Chiang C, Zhao J, Won S M, Xu S, Trumpis M, Zhong Y, Han S W, Xue Y, Xu D, Choi S W, Cauwenberghs G, Kay M, Huang Y, Viventi J, Efimov I R, Rogers J A. Capacitively coupled arrays of multiplexed flexible silicon transistors for long-term cardiac electrophysiology. Nature Biomed Eng. 2017 Mar. 1; 1(38):1-11.

The recording function of these electrodes has been previously evaluated on mouse, rat, rabbit, canine, porcine, and human hearts in proof of concept sensing and pacing studies tested on perfused atrial or ventricular tissues. The conformal electronics used in these studies were based both on passive and active resistive electrode technology.

Utilization in Balloon Catheter

The use of balloon catheters imbued with multiple sensors has been characterized previously in literature and has been shown to work in animal models. The balloon-catheter device is attractive for endocardial procedures such as AVNRT ablation therapy because it enables minimally invasive insertion into lumens or other organs of the body through small incisions. That is because of the miniaturized, cylindrical form of its deflated state. Moreover, it can be inflated to match requirements on size and shape for its interaction with the endocardial tissue. The main disadvantage is that conventional balloons offer minimal utility, because of their uniform sheets of electronically and optically inactive materials, such as polyurethane or silicone. Commercially available catheters (8-18 Fr diameter) serve as the delivery mechanisms and the general template for these types of devices.

Components that integrate with the balloons are formed on semiconductor wafers using adapted versions of planar processing techniques and methods of transfer printing reported elsewhere. Wrapping the collections of interconnected devices on the balloon in its deflated state creates the planar surface with the active components imbued on top. Encapsulating layers serve as moisture barriers to enable the entire system to operate when completely immersed in bio-fluids. These devices sense physiological signals and stimulate tissue. They are connected and powered through a thin ribbon cable based on an anisotropic conductive film that bonds to the base of the shaft that connects to the balloon, and wraps along the length of the flexible tubing of the catheter. These constructions add functionality to balloons (FIGS. 7A-C) without significantly altering their mechanical properties or the levels of expansion that they can accommodate. The mesh layouts can tolerate tensile strains of up to 200% without fracture, owing to optimized configurations guided by quantitative mechanics modeling.

More specifically, FIG. 7A shows the overall construction of a stretchable, interconnected passive network mesh integrated on a deflated balloon catheter, including connectors and ACF metal traces on the proximal side of the balloon and its wrapping configuration along the length of the catheter shaft. FIG. 7B shows an optical image of the balloon inflated by ~130% relative to its deflated state (inset). FIG. 7C shows a magnified view of non-coplanar serpentine interconnects on the balloon in its inflated state. This region corresponds to the area defined by the dotted line in FIG. 7B.

SUMMARY OF THE INVENTION

The present invention is a high resolution, multi-function, conformal electronics device generally having a flexible and stretchable, high-density electrode array, integrated with existing catheter-based technology (e.g., balloon catheter) for mapping of and corresponding localization of the arrhythmia source. The active sensing electrode array can acquire diagnostic information including electrical (e.g., electrograms), mechanical (e.g., strain measurements), impedance (e.g., resistance), metabolic (e.g., pH measurement) from the underlying heart tissue surface with which it is in contact. In the preferred embodiments, the electrode array may be designed to be of various sizes and shapes to conform to the targeted cardiac tissue architecture (e.g. atrial, ventricle, right ventricular outflow tract, coronary sinus etc.) corresponding to the specific type of cardiac arrhythmia. In the preferred embodiments, the present invention can precisely locate the source of arrhythmia as described above and deliver therapy from the same electrode array. This is achieved using a capacitive sensing electrode array that can not only monitor but also deliver electrical stimulation.

In one of the preferred embodiments, the present invention can be an implantable medical device (IMD) that can precisely locate the source of arrhythmia and deliver therapy from the same electrode array as described above. The IMD may slip over the heart as a sleeve covering the heart surface in part or its entirety. The device may have internal circuitry capable of processing the diagnostic information, determining the appropriate therapy configuration, and subsequently delivering the appropriate electrical stimulation to the site determined as the source of arrhythmia in a manner so as to restore normal heart function. The device may also wirelessly transmit information (diagnostic information, record of device activity etc.,) to an external processing unit. The device may also wirelessly receive information (patient information, therapy treatment options etc.) from the external source.

These and other objects of the invention, as well as many of the intended advantages thereof, will become more readily apparent when reference is made to the following description, taken in conjunction with the accompanying drawings.

BRIEF DESCRIPTION OF THE FIGURES

FIG. 4A is a drawing showing a tracing from Lead II and ECGs recorded from the right atrial appendage (RA), the His-bundle region (HB), and the proximal (PSP) and distal (PSD) pairs of electrodes of the mapping catheter, positioned against the right atrium between the coronary-sinus ostium and the tricuspid annulus. During fast—slow AVNRT;

FIG. 4B is a drawing showing the same tracings, but during sinus rhythm, when the slow pathway was activated in the antegrade direction, the order of the two potentials in PSD was reversed, with the A potential still coincident with the other atrial potentials. The application of radio-frequency current at this site eliminated antegrade and retrograde slow-pathway conduction and both forms of AVNRT;

FIGS. 5A-5D show images of prior art electrode mapping catheters;

FIG. 6 is an image showing conformal electronics adhered to the surface of a rabbit heart with various sensors.

FIG. 7A shows an image of a stretchable, interconnected passive network mesh integrated on a deflated balloon catheter showing the overall construction, including connectors and ACF metal traces on the proximal side of the balloon, and its wrapping configuration along the length of the catheter shaft;

FIG. 7B is an optical image of the balloon of FIG. 7A inflated by ~130% relative to its deflated state (inset);

FIG. 12 is a drawing of a configuration of a folded flexible balloon circuit board suitable for introduction to cardiac tissue;

FIGS. 13A-13C are images of a detailed arrangement of mapping electrodes with ablation and pacing electrodes interspersed (FIG. 13A), an angled view of electrodes showing height (FIG. 13B), and a full arrangement of electrodes on a balloon distal half (FIG. 13C);

FIG. 14 is a drawing of a device active electrode area overlaid on the anatomy of ToK, showing complete coverage of areas of interest;

FIG. 23 is a photograph of a model of a multifunction catheter of the present invention;

FIGS. 24A-24C are schematic drawings of a Basic Model of the multifunction catheter of the present invention having an apparatus (FIG. 24A), a Flexible Part (FIG. 24B) and a Joint Close-up (FIG. 24C);

FIG. 24D is a drawing of the top view of FIG. 24C.

DETAILED DESCRIPTION OF THE PREFERRED EMBODIMENTS

Figure 1A:
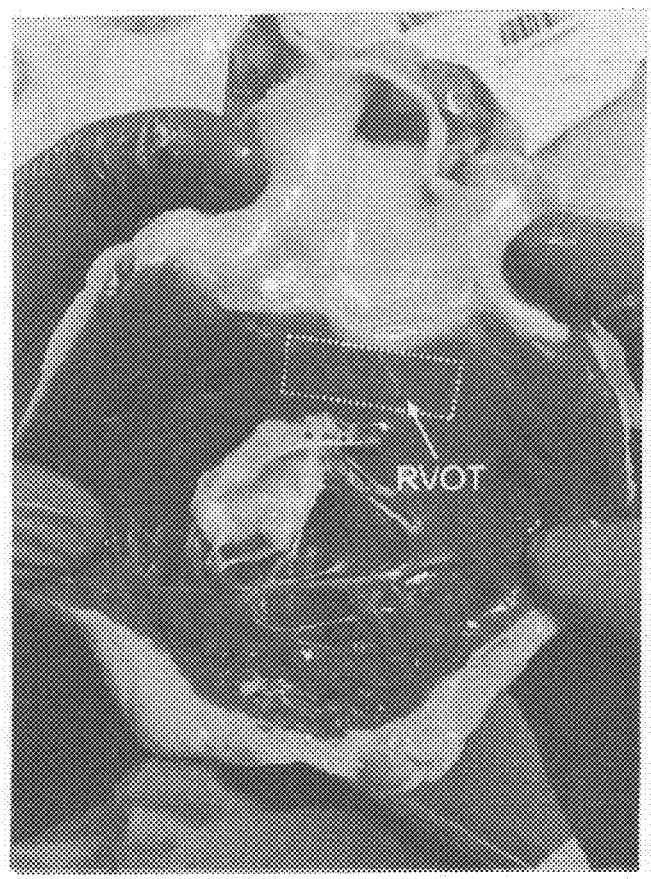
FIG. 1A is an image of the human RVOT region.
Figure 1B:
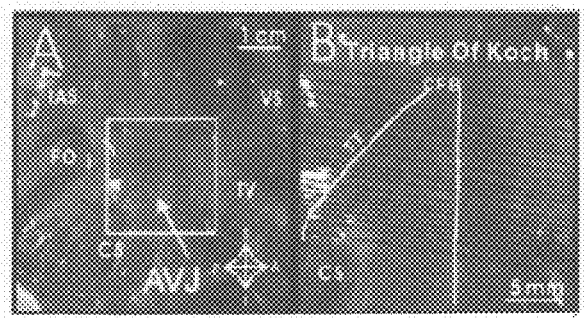
FIGS. 1B-1C show images of human AVJ.
Figure 1C:
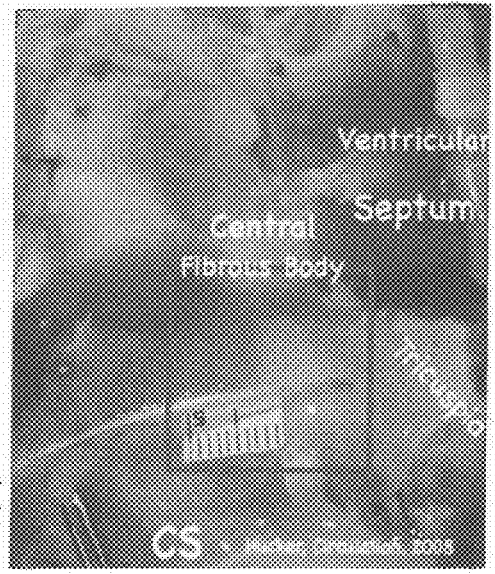
Figure 2A:
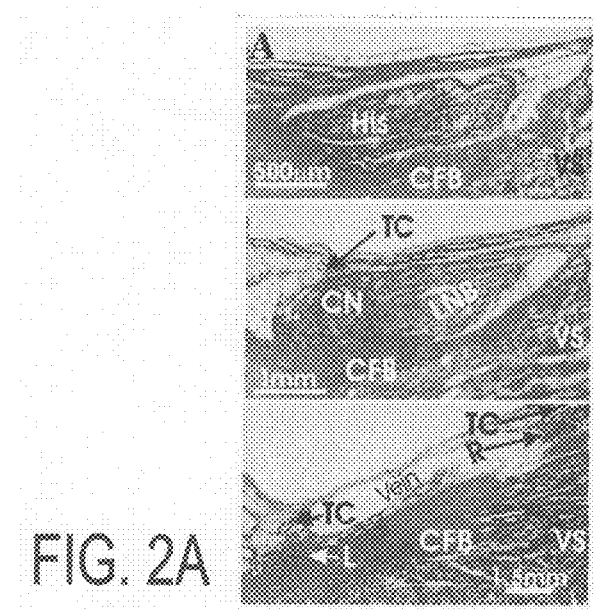
FIGS. 2A-2C are images of serial sections processed for histology (FIG. 2A) and Cx43 immunolabeling (FIG. 2B) from the human AVN taken from three separate planes, and a profile schematic (FIG. 2C)
Figure 2B:
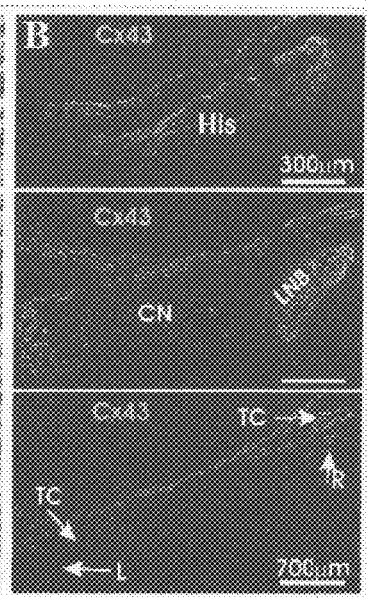
Figure 2C:
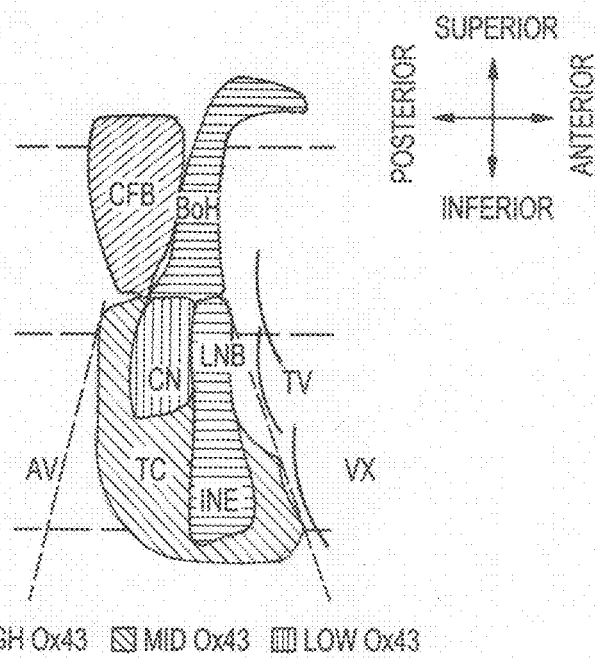
Figure 3A:
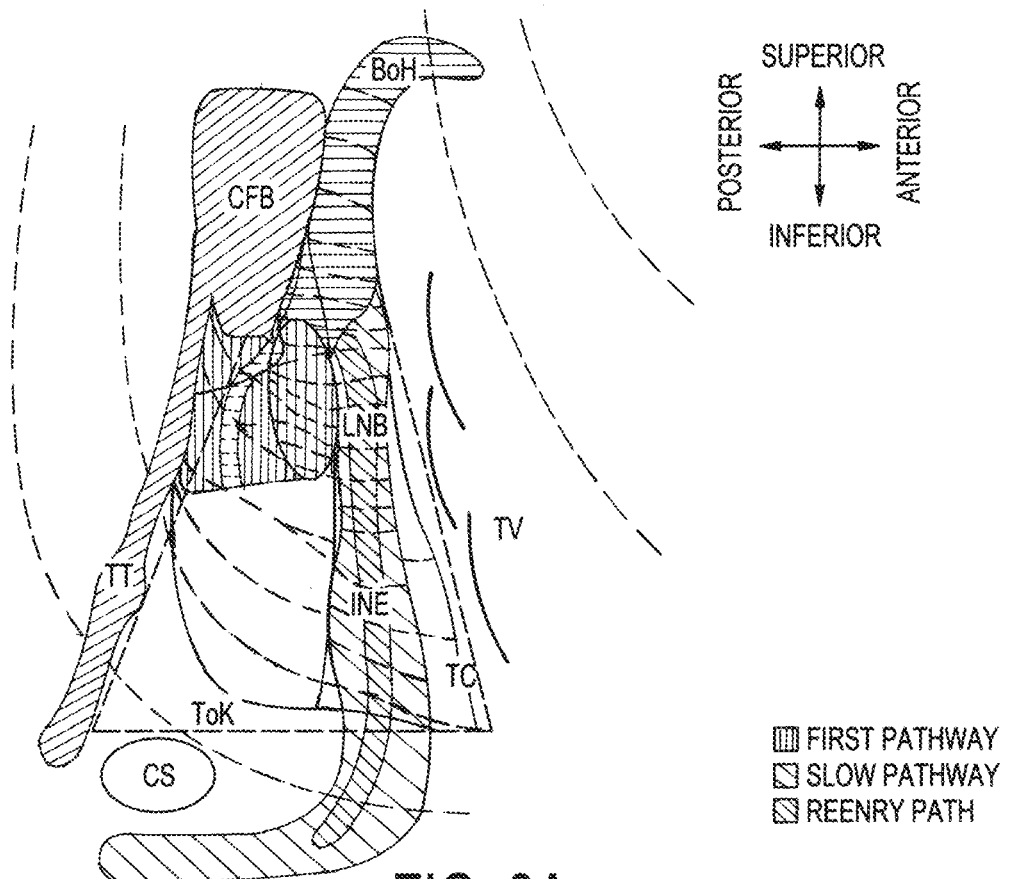
FIG. 3A is a drawing summary of the various anatomical structures that constitute the AVN and its dual conduction pathways, FP and SP.
Figures 3B, 3C, 3D:
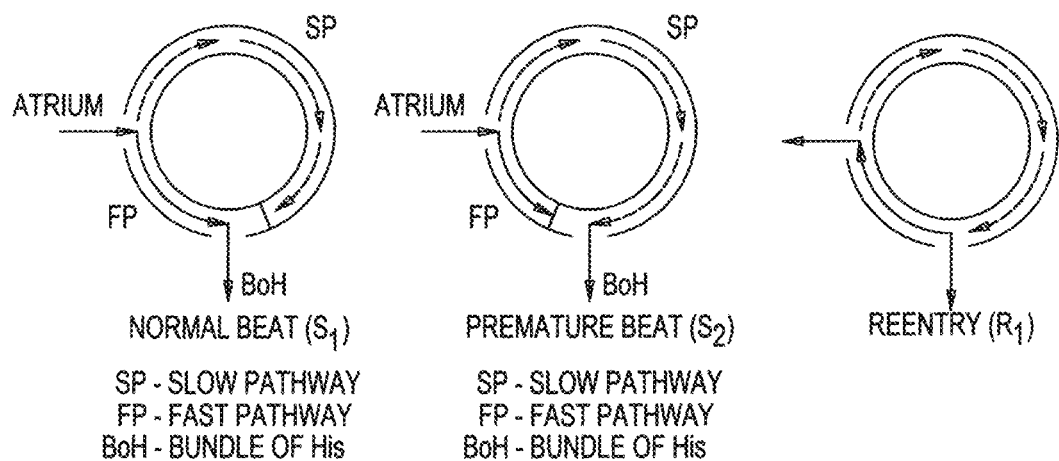
FIGS. 3B-3D are drawings of dual pathways of electrical wavefront propagation between atria and His Bundle during normal beat (FIG. 3B) and during a premature beat (FIG. 3C) resulting in a reentrant arrhythmia (FIG. 3D)
Figure 7C:
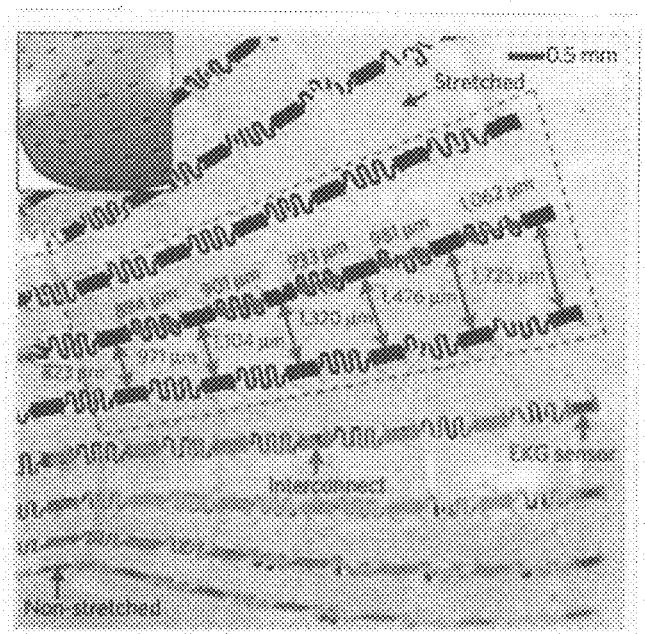
FIG. 7C is an image of a magnified view of non-coplanar serpentine interconnects on the balloon of FIG. 7B.

In describing the illustrative, non-limiting preferred embodiments of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose. Several preferred embodiments of the invention are described for illustrative purposes, it being understood that the invention may be embodied in other forms not specifically shown in the drawings.

The terminology used herein is for describing embodiments only and is not intended to be limiting of the invention. As used herein, the term "and/or" includes all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that several techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims. Novel high resolution, multi-function and conformal electronics devices, apparatuses, and methods for monitoring, detection and delivery of treatment for cardiac arrhythmias are discussed herein. In the following description, for purposes of explanation, numerous specific details are set forth in order to provide a thorough understanding of the present invention. It will be evident, however, to one skilled in the art that the present invention may be practiced without these specific details. The present disclosure is to be considered as an exemplification of the invention, and is not intended to limit the invention to the specific embodiments illustrated by the figures or description below.

Active Sensing

One preferred embodiment of the invention comprises a novel high resolution, multi-function, conformal electronics device generally comprising a flexible and stretchable, high-density (thousands) electrode array, integrated with existing catheter-based technology (e.g., balloon catheter) for mapping of and corresponding localization of the arrhythmia source. The active sensing electrode array can acquire diagnostic information including electrical (e.g., electrograms), mechanical (e.g., strain measurements), impedance (e.g., resistance), metabolic (e.g., pH measurement) from the underlying heart tissue surface with which it is in contact.

In another preferred embodiment, the electrode array may be designed to be of various sizes and shapes to conform to the targeted cardiac tissue architecture (e.g. atrial, ventricle, right ventricular outflow tract, coronary sinus etc.,) corresponding to the specific type cardiac arrhythmia.

Capacitive Sensing and Pacing and Implantable Medical device

Another preferred embodiment of the invention combines the ability of the present invention to precisely locate the source of arrhythmia with the novel ability to deliver therapy from the same electrode array. This is achieved using a capacitive sensing electrode array that can not only monitor but also deliver electrical stimulation. The electrode array can acquire diagnostic information including electrical (e.g., electrograms), mechanical (e.g., strain measurements), impedance (e.g., resistance), metabolic (e.g., pH measurement) from the underlying heart tissue surface in contact as well deliver electrical stimulated to the precise location diagnosed as the source of arrhythmia.

In still other preferred embodiments, as an implantable medical device, the electrode array slips over the heart as a sleeve covering the heart surface in part or its entirety. In preferred embodiments, the device may have internal circuitry capable of processing the diagnostic information, determining the appropriate therapy configuration, and subsequently delivering the appropriate electrical stimulation to the site determined as the source of arrhythmia in a manner as to restore normal heart function. In preferred embodiments, the device may also wirelessly transmit information (diagnostic information, record of device activity etc.) to an external source. In preferred embodiments, the device may also wirelessly receive information (patient information, therapy treatment options etc.,) from the external source.

The novel materials and electronics technology allow for the development of a novel device for use in clinical practice. This device is able to address a major shortcoming of current devices by integrating the mapping, pacing, and ablation phases of AVNRT ablation procedures into one device as well as the capabilities for additional sensing: chemical, temperature, optical, pressure etc. The high-density mapping capabilities of such a device would more quickly and precisely find the area of the atrium that requires ablation. Using the same device, and without moving that device, the ablation electrodes spread throughout the surface could be selectively activated to deliver the RF energy needed for tissue ablation. Again using the same device, and again without moving the device, the pacing electrodes spread throughout the surface of the device would deliver an arrhythmic pacing energy to verify that the AVNRT pathway has been sufficiently ablated. In one embodiment, a high density sensing array is instrumented and placed (FIG. 14) over the critical structures that determine aberrant reentry circuit of AVNRT including SP, FP, AVN; while a lower density array will be instrumented on the same conformal device over less critical parts including the atrial and HoB myocardium. Similarly, the ablation array is instrumented and placed over critical parts of the reentry circuit of the SP. A pacing array of low density will be instrumented primarily over the atrial myocardium and BoH.

Additionally, the device could include a distal tip for the purpose of anchoring the device to an ostium within the endocardium such as the CS so that motion due to cardiac contraction is minimized and the device can maintain contact with the endocardial wall. This part of the device will also include arrays of sensing and ablation in the CS.

Incorporating the necessary electrical components onto the flexible PCB material of the balloon that would provide RF therapy from the same balloon catheter and would enable a device capable of delivering appropriately targeted ablation energy without the need to position other catheters into therapeutic position. Such a device would provide all the functions of various catheters that are used in the mapping/pacing/treatment of RF ablation procedures in one multi-purpose device that can "automatically" diagnose and treat tissue.

Chiplet Technology for Mapping

The next generation conformal electronics technology called the Chiplets, utilizes the flexible and stretchable electronics membrane previously described and is now populated with hundreds of self-contained microcircuit assemblies called "chiplets" comprised of integrated actuators, sensors, amplifiers, and multiplexers.

Figure 8:
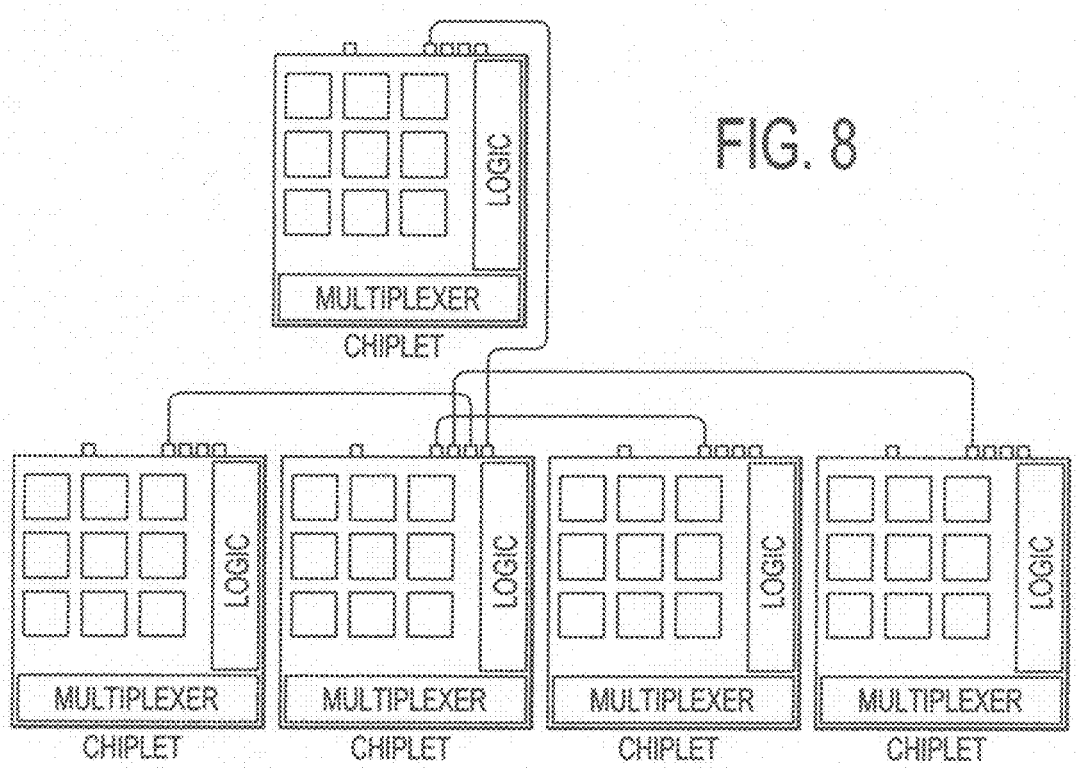
FIG. 8 is a drawing showing a real time chiplet network.

Each chiplet has a built-in microcircuit assembly including input, output, onsite multiplexer, logic gate, and a sensor/actuator, as shown for instance in FIG. 8. Each chiplet communicates with its neighbors, thus forming real-time networks of sensing and/or actuating chiplets.

The logic gates in the chiplets can compute real time information. For e.g., the direction of an incoming propagating wavefront, by tracking the activation time, conduction velocity etc., and then use that information to deliver real time therapy (e.g., localized stimulation or ablation).

These developments have the promise of allowing for the creation of devices with larger scale and higher density of sensors than current technologies with which to map the aberrant cardiac tissue and can be readily achieved in a way that leverages advanced processing techniques. These allow for coverage across entire sections of cardiac tissue by affixing layers of electronics to the flexible board. There are no fundamental hurdles, for example, in achieving systems with thousands or even hundreds of thousands of electrodes for mapping electronic signals of the cardiac tissue. Autocorrelation methods can be used to identify the node spacing that will maximize acquisition of electrophysiological data while reducing unnecessary redundancy.

Coverage across endocardium tissue can occur by integrating the electronics onto or into the surface of a balloon catheter. Energy delivery capabilities for both pacing and ablation could stem from developing high definition stimulators. The new innovations in the field allow large area, conformal electrodes suitable for sensing cardiac electrical activity, and delivering cardiac electrical stimulation have the potential to enable clinically safe systems capable of diagnosing and treating patients with life threatening arrhythmias in real time.

The technology by John Roger's group disclosed in the US patent and publications set out above is the first to incorporate all of the key features needed for use in high-speed, high-resolution cardiac electrophysiology. First, it facilitates large area formats with integrated active electronics for multiplexing and signal amplification on a per-channel level. It utilizes thin, flexible device mechanics for integration and high-fidelity measurement on the curved, moving surfaces of the heart. The cumulative levels of leakage current to the surrounding tissue remain well below 1 µA for safe operation. It has long-lived, thin, bendable bio-fluid barriers as, hermetic sealing of the underlying electronics for stable, reliable function. Further, it includes biocompatible interfaces for long-term use, without either direct or indirect contact to traditional electronic materials.

Figure 9A:
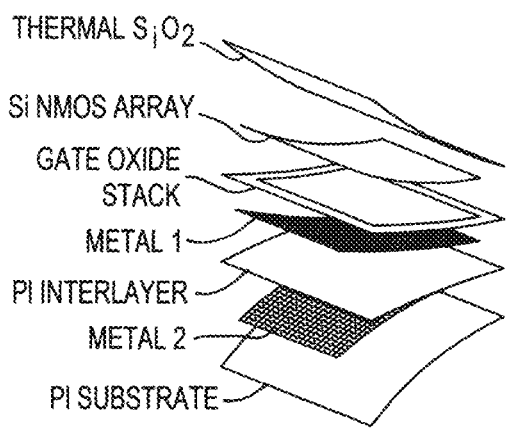
FIG. 9A is an exploded-view schematic highlighting the key functional layers of a node or sensor contained in a chiplet that makes up the chiplet network of FIG. 8.
Figure 9B:
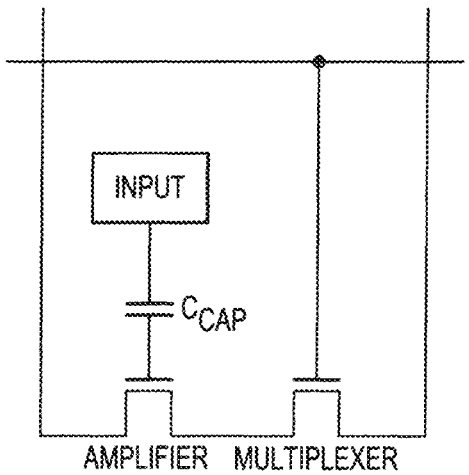
FIG. 9B is a circuit diagram for a node in the capacitively coupled array of the chiplet network of FIG. 8, with annotations for each component.
Figure 9C:
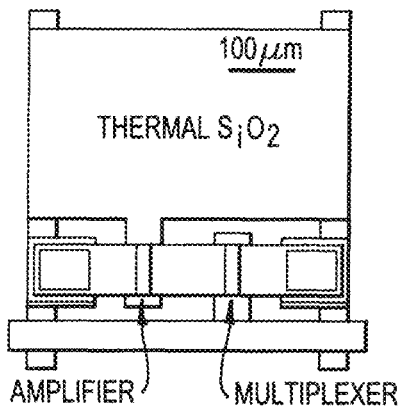
FIG. 9C is an optical microscope image of the node or cell of FIG. 9A.
Figure 9D:
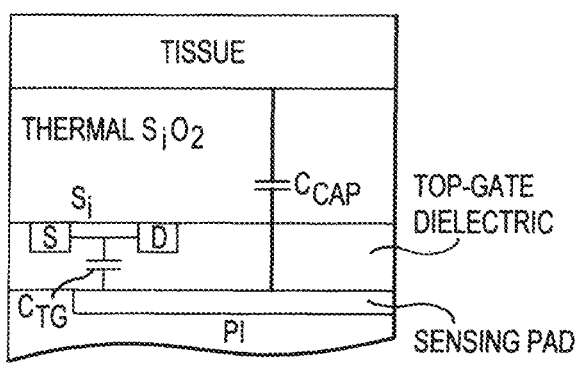
FIG. 9D is a schematic diagram of the circuit cross-section of FIG. 9E.
Figure 9E:
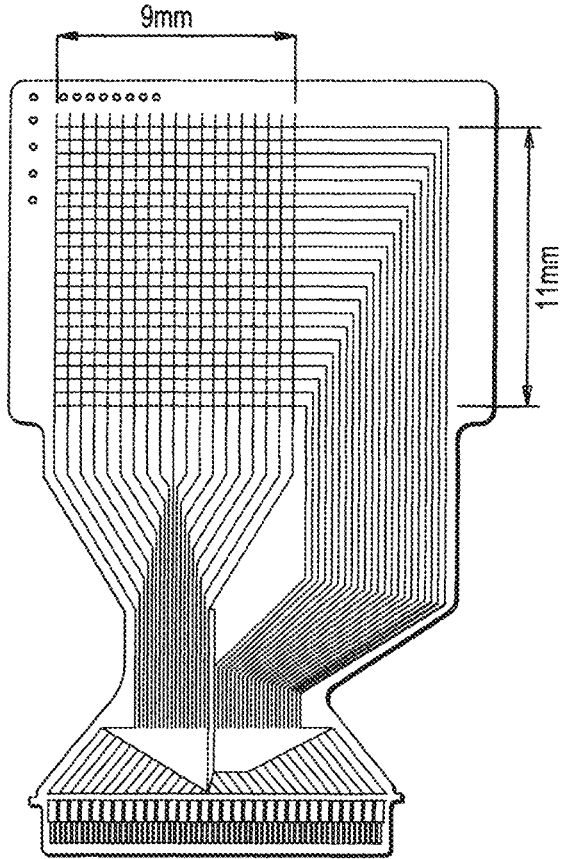
FIG. 9E is a schematic illustration of an 18×22 array of active multiplexed channels.

One embodiment of the invention can have, for example, 396 multiplexed capacitive sensors (18 columns, 22 rows), each with dimensions of 500×500 as shown in FIG. 9E, distributed uniformly over a total area of 9×11 mm for a density of 4 sensors/mm2. Each sensor can include two underlying Si NM transistors, one of which connects to a metal pad from its gate electrode (FIG. 9B). A layer of thermally grown silicon dioxide covers the entire top surface of the system (FIG. 9A). This thin thermal SiO2 layer as the dielectric for capacitive coupling of adjacent tissue to the semiconducting channels of the associated Si NM transistors, and as a barrier layer that prevents penetration of bio-fluids to the underlying metal electrode and associated active electronics (FIG. 9D). The total thickness of the chiplet is 38 µm. This fabrication process is capable of scaling up to the largest silicon wafers available, which is currently 450 mm diameter. More particularly, FIG. 9A shows an exploded view schematic highlighting the key functional layers of the chiplet; FIG. 9B shows a circuit diagram for a node in this capacitively coupled array, with annotations for each component; FIG. 9C shows an optical microscope image of the cell; FIG. 9D shows a schematic of the circuit cross-section; and FIG. 9E is a schematic illustration of an 18×22 array of active multiplexed channels. See Fang, Hui et al., Capacitively coupled arrays of multiplexed flexible silicon transistors for long-term cardiac electrophysiology, Nature Biomedical Eng. 1 (2017): 0038, the disclosure of which is incorporated in its entirety herein.

Multi-function Integrated Sensors and Actuators

Figure 10:
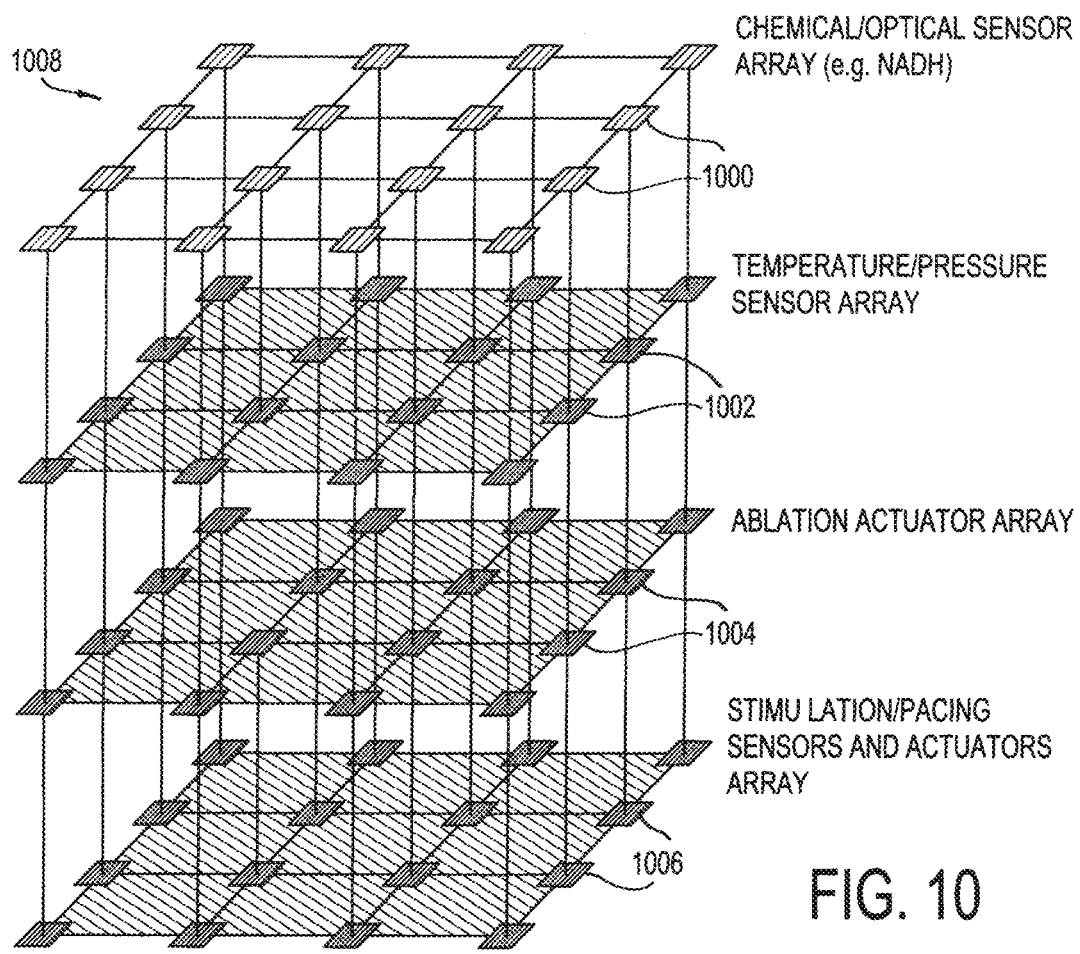
FIG. 10 is an exploded drawing of an integrated 3D Real Time Multifunction Chiplet Network.

FIG. 10 shows an exploded drawing of an integrated 3D real time multifunction chiplet network 1008 suitable for use with the disclosed invention for catheter based cardiac mapping and arrhythmia therapy functionality. This type of array has multifunction capabilities for electrical sensing, electrical stimulation, RF ablation, chemical sensing, optical sensing, pressure sensing, temperature sensing. More specifically, the integrated 3D real time multifunction chiplet network shown in FIG. 10 can have layers/arrays of chiplets designed to function as a chemical/optical sensor array (e.g., NADH), using chiplets 1000, a temperature/pressure sensor array using chiplets 1002, an ablation actuator array using chiplets 1004 and a stimulation/pacing sensors and actuators array using chiplets 1006.

The integrated 3D chiplet network of FIG. 10 for use with the catheter of the present invention has multi-function capabilities. Each of the networks can provide local information on metabolic, excitable, ionic, contractile, and thermal sate for investigations of both the spatial and temporal responses to variety of insults, diseases, and therapies.

In addition to the numerous diagnostic applications of these devices, there are also sensing and actuating capabilities that make them a relevant therapeutic tool. The same optical/LED electrode arrays can be used in spatially targeted optogenetics or the release of light-activated drugs or track metabolic activity (e.g., NADH fluorescence). A protocol was recently published outlining the feasible use of these LEDs in a device designed for optogenetic studies in neuroscience McCall J G, Kim T I, Shin G, Huang X, Jung Y H, Al-Hasani R, Omenetto F G, Bruchas M R, Rogers J A. Fabrication and application of flexible, multimodal light-emitting devices for wireless optogenetics. Nat Protoc. 2013 December; 8(12):2413-2428. The wavelengths are already tailored for excitation of light sensitive channel Rhodopsin membrane receptors. The LEDs can also be paired with photodiodes to include feedback on the area that is receiving illumination. Using stretchable membranes in place of fiber optics could provide an internal light source that does not impede physical behavior, a significant hurdle in in vivo optogenetic studies and eventual transition to clinical use of any therapy that relies on light.

Moreover, incorporating the chiplet network 1008 sensors in a number of clinical procedures could provide clinicians with much-needed feedback on the instantaneous effect of therapy. The temperature and pressure sensors can help guide protocols for the duration and force applied to ablation catheters by measuring the increase in tissue temperature and the extent of tissue that has increased in temperature.

Additionally, the signal morphology of the electrograms can help identify regions of effective conduction block, equivalent to successful ablation lines. If these sensors were to remain on the patient's heart after the procedure, the device could alert the physician when a line of block recovers. The time course of recovery may help explain the mechanism of arrhythmia recurrence after ablation procedures and guide new ablation techniques that could circumvent this occurrence.

Another clinical therapy that might benefit from the addition of such a chiplet network 1008 is the use of stimulators and defibrillators. With a combination of sensing and shocking electrodes, a device could be conceived for high definition therapy, targeting only the spatially vulnerable regions as identified by the sensors instead of limiting the shock to a single vector. A defibrillation protocol that takes full advantage of the spatial coverage of the electrodes can be implemented to target arrhythmias with a potential decrease in peak voltage required to successfully defibrillate. Additional sensors including pH or ionic sensors can be used/added to instantaneously indicate myocardial injury due to high voltage shocks or reduce the number of inappropriate shocks.

As shown in the non-limiting embodiment of FIG. 10, the various arrays 1000, 1002, 1004, 1006 can be formed in a single unitary structure. And the arrays can be for instance overlaid on top of each other whereby the stimulation array 1006 is the bottom layer, the ablation array 1004 is a layer that is formed over the stimulation array 1006, the sensor array 1002 is a layer that is formed over the ablation array 1004, and the optional sensor array 1000 is a top layer that is formed over the sensor array 1002. In addition, each array 1000, 1002, 1004, 1006 can be a planar square or rectangular shaped array having chiplets formed in rows and columns and are evenly-spaced apart from each other. Each array can be formed in a plane that is substantially parallel to the planes of the other arrays, and the chiplets in each array can be aligned with respective chiplets in the other arrays. However, as will be partly illustrated in the embodiments below, the arrays can be formed in other suitable configurations that differ from FIG. 10. For instance, ablation array 1004 need not be sandwiched between the stimulation array 1006 and the sensor array 1002. Rather, the arrays can be arranged in other orders, such as the sensor array 1002 at the bottom layer. In addition, the one or more of the arrays can be formed in a single planar array, for instance sensor chiplets, ablation chiplets, and/or stimulation chiplets can be formed in a single planar array. In addition, the chiplets in each array need not be aligned with each other, but can be offset.

Catheter Design and Different Configurations Retractable umbrella

The primary design requirement is to create a single device that maps, ablates, and paces the atrium for patients with AVNRT, RVOT, LA, RA, LV, and RV. It must be large enough so that the active components of the device are in contact with the region of interest. The device must be able to correlate a mapped section of aberrant tissue to ablation electrodes for targeting that tissue. The device must be stable during use inside a beating heart. The density of the electrodes for mapping should be adequate for locating aberrant tissue. The density of ablation electrodes should be sufficient so that the ablated tissue around a single electrode can overlap/meet the tissue that would be ablated by an adjacent electrode. The pacing electrodes must be present in the ToK so that the AVNRT pathway is triggered after ablation to ensure successful treatment. The device must be able to be delivered to the right atrium as well as retracted after use. Each of these design requirements must be evaluated to fulfill a clinical or engineering specification so that the specification of the device meets the requirements.

One preferred embodiment of the invention designed to be applied to the ToK is one of a balloon catheter that can be inflated in the right atrium and contacted to the endocardial tissue that comprises the Triangle of Koch. Measurements of the ToK show that the longest distance from one point of the TOK to another is along the TV with the longest measured length being about 43 mm. If the distal tip of the catheter is inserted into the CS to provide stability, the inflated balloon would need to reach from the center of the CS to the furthest end of the ToK.

Figure 11A:
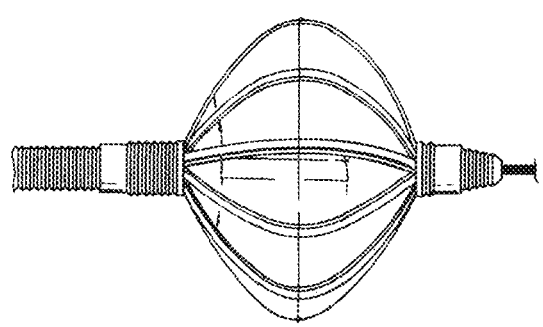
FIG. 11A is an image showing an inflated balloon catheter with blind folding strips highlighted.
Figure 11B:
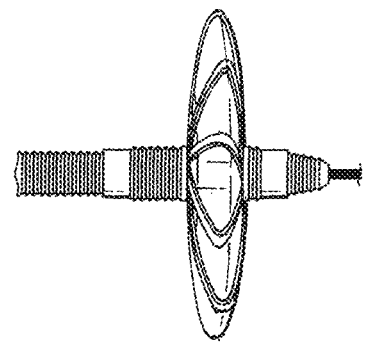
FIG. 11B is an image showing a flattened-inflated balloon catheter corresponding to the inflated balloon catheter of FIG. 11A, ready to make contact with endocardium.

Flattening the catheter would significantly reduce the volume it occupies within the atrium when inflated, while also serving to maximize the distal surface area that comes into contact with tissue. This can be done by utilizing a retractable distal section of the catheter that decreases the distance between the ends of the balloon and reduces the sphericity of the balloon so as to make an oblate spheroid which resembles of a "puck" or "pancake" shape as shown in FIG. 11B. In doing so, it can significantly reduce the amount of material needed to be deployed within the atrium while maintaining the same coverage of the ToK and mapping and treatment capabilities. The longest measured length from the coronary sinus to the Bundle of His was about 43 mm. Using the reference distance of 43 mm as a radius for what a flattened balloon side (this is effectively a 2D circle pressed to the tissue) must be to cover the area from the CS where the catheter tip would be anchored, to the end of the ToK. FIG. 11B shows a flattened inflated balloon catheter ready to make contact with the endocardium.

Maintaining an oblate spheroid structure by inflating the balloon and compressing the ends together gives the balloon catheter structural rigidity in order to apply contact to the endocardial wall without the use of rigid components that may be dangerous to introduce into the atrium. Additionally, it allows for the device to meet the dimensional requirements of a device that can cover the entire ToK of a patient with the largest observed area. The oblate spheroid design also allows for the ability to inflate the device to a lesser extent if the patient ToK is smaller and the fully expanded distal half of the balloon is not required to be pressed against the ToK.

Deployment Mechanism

When the device is being deployed, the flexible balloon circuit board must be folded within the catheter assembly and inflated within the atrium to the desired size. Folding is a commonly used manufacturing step for balloon catheters and commercially available equipment is able to be ordered for any design specification.

However, the flexibility of the capacitive charged electrode circuit board substrate is limited to bending along an arc with a radius of 5 mm. Any catheter pleating and folding design would require the balloon surface to be folded about an arc with radius of 0.02 mm. Therefore, there would have to be regions of the balloon along the longitudinal axis of the balloon catheter that is not imbued with capacitive sensors atop a functional circuit board. This would create thin "blind lines" along the balloon where no sensing, pacing, or ablation could occur. Such blind lines are shown on the inflated balloon catheter of FIG. 11A.

The largest catheter in clinical practice is 18 Fr or 6 mm diameter. An oblate spheroid with a radius of 43 mm has a surface area of 11617 mm2. When that oblate spheroid SA is relaxed to a sphere for maximized efficiency during packing, it would have a circumference of 188 mm. This means that the outer circumference of 188 mm of the balloon must fit into the 6 mm diameter space of an 18 Fr catheter. Pleating the balloon for insertion into the catheter is common practice for balloon catheters. The 6 mm diameter catheter has an outer circumference of 18.84 mm. Therefore, the balloon would have to be pleated 20 times to fit within the catheter space. The chiplet arrays are 38 μm in thickness. Adherence on a 1.4 μm thick polyurethane balloon typically used in other balloon catheters would increase the total thickness of the balloon to 39.4 μm. The 20 pleats can be dispersed around the catheter in any arrangement of many that are possible in such devices but one possible and simple arrangement would be with 10 pleats on either side of the central lumen of the catheter as shown in FIG. 12. The width of each pleating area must be a minimum of 247.5 μm wide to complete a semicircle from one chiplet to the same point on the next chiplet across the pleated segment. This is calculated by taking the thickness of the two chiplets and calculating the arc length that would link their bases.

Electrode Layout

The catheter would only need to have sensors placed on the distal hemisphere for contact with endocardial tissue when inserted into the right atrium. This means that the proximal half of the balloon can be composed of more traditional and flexible materials such as polyurethane to reduce complexity of the device.

As previously stated, the technology is readily transferable to a 450 mm diameter wafer design. Therefore, a configuration with the distal end of the device imbued with the novel conformal electronics would be implemented for a 86 mm diameter wafer for manufacturing.

The design of the conformal electronics allows the electrode layout to become less important than in previous devices that incorporated multiple sensors on the same catheter due to the sheer volume of sensors that can be placed throughout the active surface of the device. The distal half of the balloon catheter in the oblate spheroid configuration is 5808 mm2 with 113 mm2 in the center unavailable because of the lumen of the catheter. Additionally, there are 20 pleats along the length of the distal half of the balloon each at 0.250 mm thickness, meaning another 215 mm2 of the balloon cannot have sensors for the chiplets. This means that 5480 mm2 of the balloon is available for placement of electronics.

As previously discussed, each ablation electrode is 290× 560 μm and can ablate a region of tissue with 1.6 mm diameter. The same electrodes can also be used to deliver pacing energy to the endocardium. In order to realize the design requirement that the device must be able to ablate any point along the distal half of the balloon, the ablation electrodes must be no further than 1.6 mm apart. This distance also ensures that ablation can occur along a continuous vector of electrodes if a large area of tissue or a linear area of tissue needs to be ablated. Ablation electrodes are present on alternating rows of electronics. The rows that do not include ablation electrodes only had mapping sensors. In the rows which included ablation electrodes, the ablation electrode was on the first and last position in the row with mapping electrodes and ablation electrodes alternating within that row. For the purposes of this design, the wiring of the electrodes will be done in such a way that it is routed on the opposite side of the PCB, and through the lumen of the device. The 5 mm lumen of the catheter has 78.5 mm2 of cross-sectional area to route the necessary electronics through. This is especially important, as the lumen will incorporate a retractable support rod that extends distally to maintain the other end of the balloon and the distal tip of the balloon as well as a mechanism of delivering fluid to the balloon for inflation.

For some rows, two adjacent mapping sensors were utilized so that the spacing allowed for an ablation electrode to be placed at the end of the row. The reason for the ablation electrodes to be placed on the end of the rows is because the blind sections of the balloon without electronics intended for folding the balloon would cause a gap larger than 1.6 mm between ablation electrodes. Placing ablation electrodes on the ends of rows ensures that no ablation electrode is ever more than 1.6 mm apart from the adjacent one. FIGS. 13A-13C show diagrams of chiplet electrodes and sensors 1000, 1002, 1006, or a combination thereof, dispersed in an arrangement allowing for folding lines expanding radially and ablation electrodes 1004 (seen as longer and narrower) never more than 1.6 mm apart to ensure that any area of the balloon can have energy delivered to it at any time. The final arrangement of electronics included 4720 ablation/pacing electrodes and 12140 mapping sensors.

FIG. 14 is a drawing showing the active electrode area of the device described herein overlaid on the anatomy of ToK to demonstrate the complete coverage of areas of interest.

Comparison of Workflow

Figure 15:
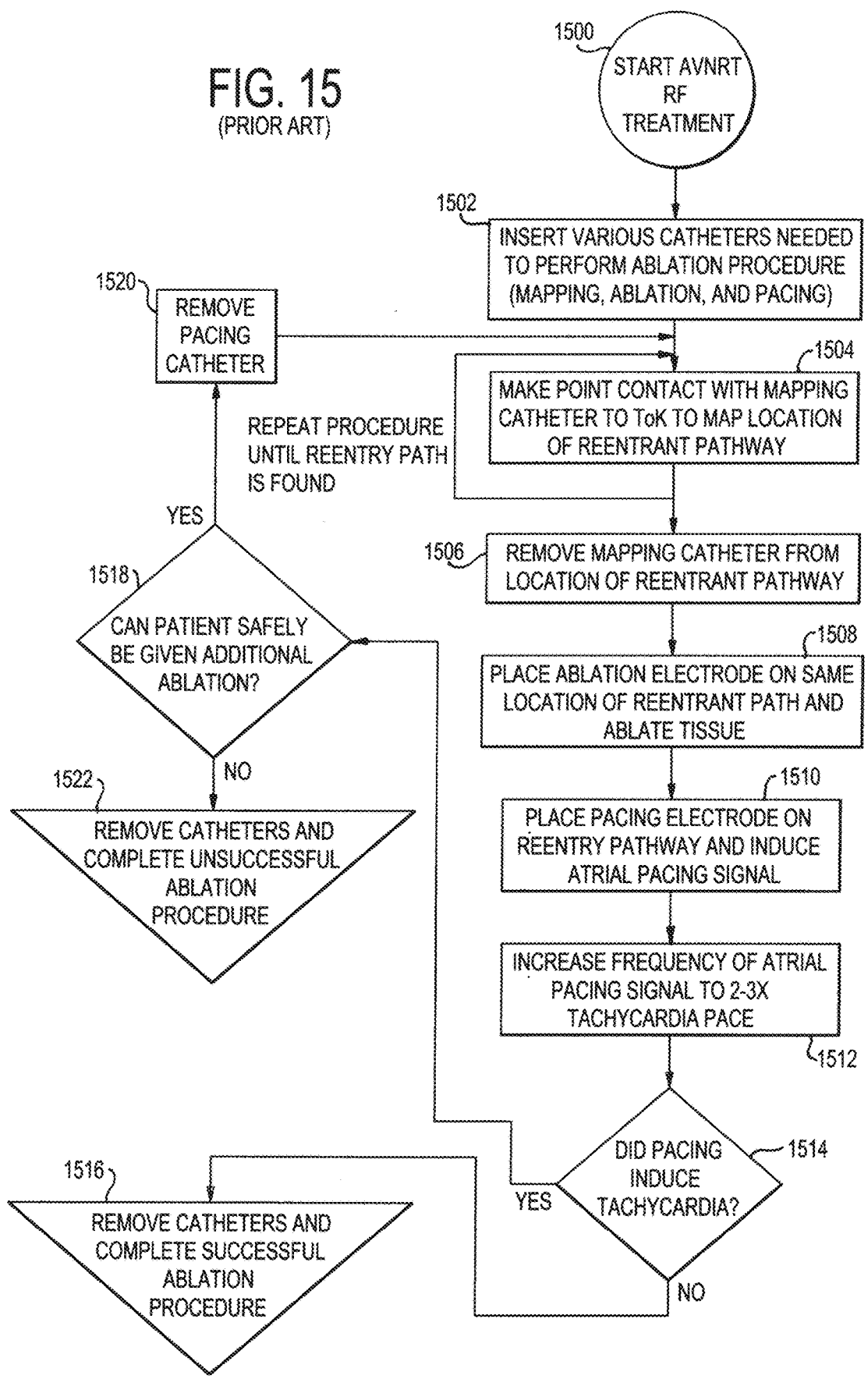
FIG. 15 is a schematic block diagram of the AVRNT ablation procedure workflow as is currently practiced.

A comparison of the workflow currently practiced for the ablation procedure in AVNRT is shown in FIG. 15. At step 1500, the AVNRT RF treatment is started. Various catheters needed to perform the ablation procedure, such as mapping, ablation and pacing are then inserted into the patient at step 1502. Then, at step 1504, point contact is made with the mapping catheter to the ToK to map the location of the reentrant pathway. The procedure of step 1504 is repeated, as necessary, until the reentry pathway is found. Next, at step 1506, the mapping catheter is removed from the location of the reentrant pathway. The ablation electrode is then placed on the same location of the reentrant pathway and tissue is ablated, at step 1508. Then, the pacing electrode is placed on the reentrant pathway and is used to induce an atrial pacing signal, at step 1510. The frequency of the atrial pacing signal is next increased to 2-3 times the tachycardia pace at step 1512 and then a determination is made at step 1514 of whether the pacing signal induced tachycardia. If it is determined that tachycardia was induced, then a determination is made at step 1518 of whether the patent can safely be given additional ablation. If tachycardia was not induced by the pacing signal at step 1514, then the procedure is considered to be successfully completed and the catheters are removed at step 1516. If it is determined at step 1518 that the patient can safely be given additional ablation, then the pacing catheter is removed at step 1520 and then the ablation procedure commences again at step 1504. If it is determined at step 1518 that the patient cannot be given additional ablation, then the catheters are removed and the ablation procedure is considered unsuccessful.

Figure 16:
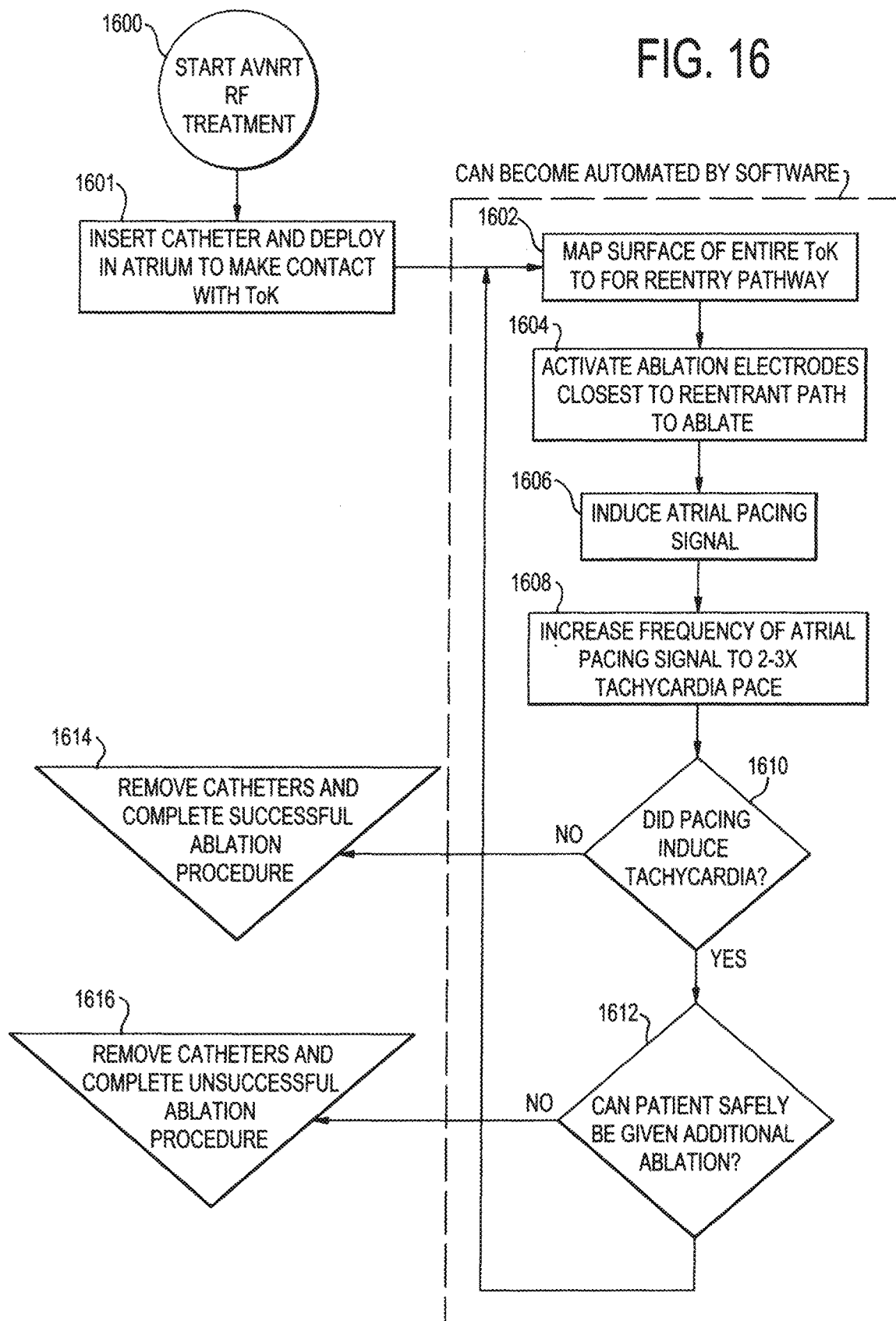
FIG. 16 is a schematic block diagram of the AVRNT ablation procedure workflow using the present invention.

FIG. 16 shows the workflow steps that the multifunction catheter of the present invention would utilize. Steps 1602 through 1612 can be automated by software, if desired. At step 1600, the AVNRT RF treatment is started. Then, the catheter of the present invention is inserted into the patient and deployed in the atrium to make contact with the ToK at step 1601. The surface of the entire ToK is mapped to find the reentrant pathway at step 1602. Then, at step 1604, the ablation electrodes 1006 closest to the reentrant pathway are activated to perform ablation. Next, atrial pacing is induced at step 1606. Then, the frequency of the atrial pacing signal is increased to 2-3 times the tachycardia pace at step 1608 and a determination is made at step 1610 of whether that pacing induced tachycardia. If it did, then the ablation procedure is considered successful at step 1614 and the multifunction catheter is removed. If a negative determination is made at step 1610, then a determination is made at step 1612 of whether the patient can safely be given additional ablation. If the patient can safely be given additional ablation, then, at step 1602, mapping the surface of the entire ToK to find the reentrant pathway is repeated, and the procedure then continues with step 1604, and beyond. If it is determined at step 1612 that the patient cannot safely be given additional ablation, then the catheter of the present invention is removed and the ablation procedure is considered unsuccessful. In addition to being easily automated, the use of the multifunction catheter of the present invention provides for a less complicated, less mistake-prone and more efficient procedure.

Design Specifications—RVOT

The catheter disclosed herein is designed for safe, fast and efficient right ventricle outflow tract (RVOT) endocardial mapping and ablation use. Its skeleton body is defined by a deployable mechanism comprising separately operated rods which appear from separately operated coaxial tubes and a 2 ply inflatable tube-shaped sleeve placed on an outer surface of the skeleton body. The sleeve fits tightly to the surface of ventricle chamber walls and holds the input/output electronics previously described herein. A hollow cross-section allows blood to flow through a deployed and working catheter if it is used in an outflow tract.

The present invention is a direct reaction to the need of a completely novel approach to electrophysiological procedures in the specific area of a human heart right ventricle outflow tract. This invention provides both a method and an apparatus for performing electrophysiological (EP) studies and radio-frequency ablation procedures.

The vast majority of ventricular arrhythmias in patients with structurally normal hearts originate in the right ventricle outflow tract. These rhythm abnormalities are induced by arrhythmogenic foci and are manifested by premature ventricular contractions (PVCs)—from benign PVCs at the beginning up to sustained ventricle outflow tract tachycardia on the other side which could be really malignant in a structurally normal heart. These arrhythmia sources could be suppressed with anti-arrhythmic drugs or physically eliminated—treated by catheter ablation procedures. Patient comfort, anesthesia and fluoroscopy burden, duration and precision of intervention and also economic aspects are passionately discussed in present times. There were several important inventions which improved cardiac electrophysiology generally in past times but none of them were aimed to the specific RVOT area. A typical RVOT EP study needs a computer mapping system with a point by point or fast anatomical mapping method with one or a multipolar catheter acquisition option. The catheter is operated by a physician and maps RVOT surface potentials in usually tens of minutes by moving it around in cooperation with a clinical engineer who operates the EP mapping system and the following ablation procedure The present invention is based on a completely novel approach to RVOT mapping and ablation catheter design and methods. The novel electrophysiology catheter has two main basic elements—a deployable carrier cage and an inflatable tubular sleeve. Both parts are functional objects of the invention.

As previously discussed, the deployable mechanism includes a carrier of the sleeve and of the electronics directly. It is hollow inside, and may preferably be of either an "eel cage" or "tulip" like shape made to reach as close as possible to the pulmonary valve without affecting the valve's function.

Figure 17:
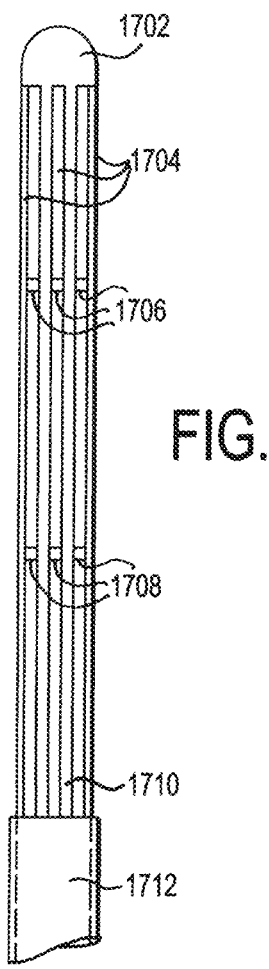
FIG. 17 is a drawing of the multi-function catheter of the present invention in its folded skeleton of "Eel Cage" configuration.

FIG. 17 shows a folded skeleton catheter 1700 of an "Eel Cage" configuration preferred embodiment. It has two sets of rod joints. The distal part 1702 of the folded skeleton deployment mechanism 1700 has a distal part 1702 at its tip. Rods 1704 are mounted with elastic material connections and can move in the direction of the catheter axis, which allows folding and unfolding the catheter 1700. In the folded configuration the rods 1704 are an inward position, and in the unfolded configuration the rods 1704 are extended outward with respect to the inner tube 1710. The catheter or deployment mechanism 1700 could be made as driven-by-wire. In that case it's hollow lumen center contains the wires. The distal part 1702 is a constituent part of the inner pull tube 1710. The catheter 1700 could have 3 or more rods to make itself into the "eel cage" shape if deployed. The rods 1704 are preferably made from a harder material compared with the softer material used for the joints or connections 1706, 1708.

The joints 1706, 1708 are preferably made from an elastic material and allow movement in the catheter axis direction as distal part connections. The inner pull tube 1710 holds the distal parts of the rods 1704. The center of the inner pull tube 1710 could be a hollow space for introducing wire. The outer tube 1712 is coaxial with the inner tube 1710. The rods 1704 are placed between the inner 1710 and outer tube 1712 and go up to a controller (not shown).

The distal part 1702 is placed near to the PV and the proximal part of the catheter 1700 flexibly adjoins the RVOT. The correct shape of the device is reached by movements elongating or shortening the rods 1704. The rods 1704 could be operated as a coupled group or as independently driven rods, which allows the most possible flexibility fitting to the chamber walls. Independent rod operation is important to the proper shaping of the mechanism function. Each rod has at least one joint connection 1706, 1708 as shown and described in connection with FIG. 17. The second joint 1708 is not needed in the "tulip" preferred embodiment (FIG. 19) because each rod 1704 is flexible and since it arises from the catheter tube (the space between outer tube 1712 and the inner tube 1710), it is pushed towards the chamber wall naturally. This principle is obvious from the drawing of FIG. 19, which shows a working view of the skeleton deployable mechanism of FIG. 17 with the unfolded arms in a "tulip" configuration.

A tubular shaped sleeve or balloon is made as a hollow unit, which is formed and supported by gas pressure inside and/or with the deployable mechanism from an inner surface. As previously described, it carries the EP sensors/actuators/electronics.

Figure 18:
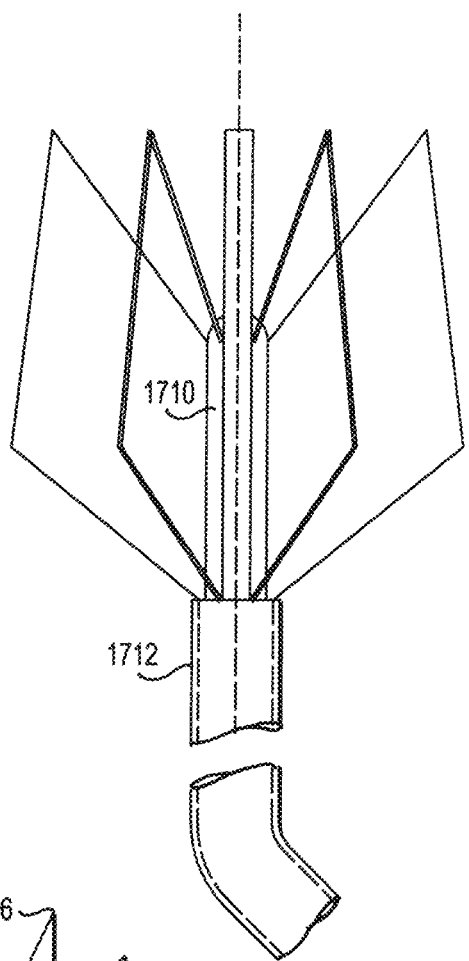
FIG. 18 is a drawing of a working (deployed) catheter of the "Eel cage" skeleton multi-function catheter of FIG. 17.

FIG. 18 shows a working (deployed) view of the "Eel cage" skeleton preferred embodiment of the catheter 1700 shown in FIG. 17. The inner pull tube 1710 holds the distal parts of the rods 1704. The center of the inner pull tube 1710, as described above, could be hollow in its center to allow a space for introducing wire. The outer tube 1712, as previously described, is coaxial with the inner tube 1710. The rods 1704 are placed between the inner and outer tubes and go up to a controller (not shown).

Figure 19:
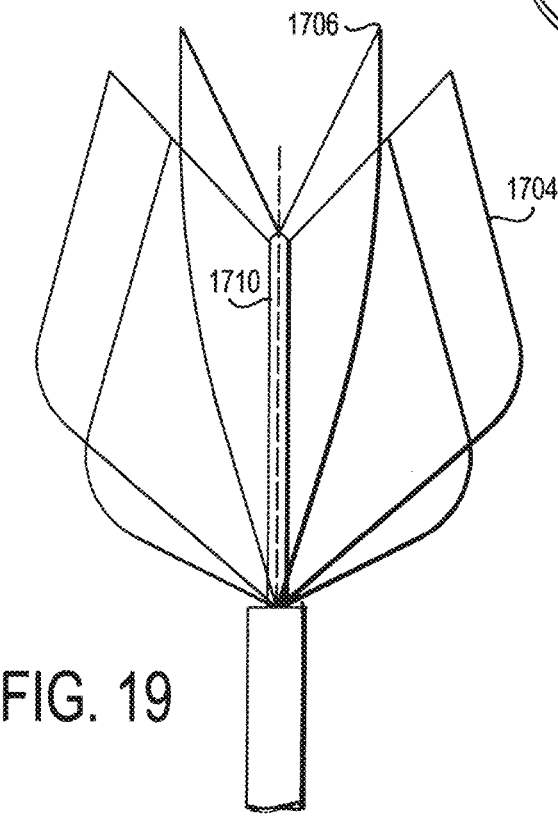
FIG. 19 is a drawing of a "tulip" modification of the working (deployed) skeleton multi-function catheter of FIG. 18.

FIG. 19 shows an alternate preferred embodiment of the catheter 1700 having a "tulip" modification of the working (deployed) skeleton. Rods 1704 are used to form the tulip shape of the deployed catheter. It should be noted that the "tulip" configuration of the catheter 1700 requires one less joint 1706, 1708 than the "eel cage" embodiment. The joint 1706 is formed of an elastic material. In this "tulip" modification, the proximal joints 1708 are not needed. Thus, manufacturing the "tulip" shaped catheter should be easier while still preserving the same functionality as the "eel cage" shaped catheter.

Figure 20:
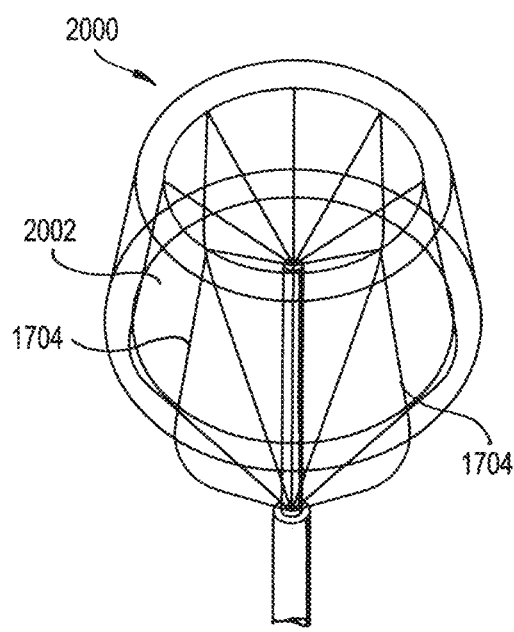
FIG. 20 is a full view drawing of a deployed catheter with inflated tubular shaped sleeve mounted on the cage of the multifunctional catheter of FIG. 19.

FIG. 20 shows full view of a deployed catheter 2000 with an inflated tube or sleeve 2002. The tubular shaped sleeve 2002 is mounted on the cage formed by the plurality of rods 1704. It is deflated when the catheter is folded. The sleeve 2002 is inflated after deploying the catheter 2000 to achieve tight fitting to the surface of the RVOT. For safety reasons, the sleeve 2002 could preferably be made as two ply gas inflatable device.

Figure 21A:
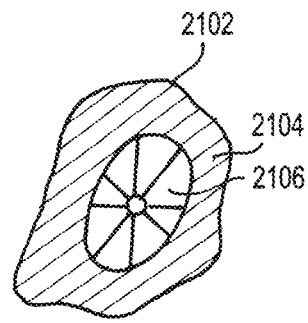
FIGS. 21A-21B are cross-section drawings of a superior view of a multifunction catheter of the present invention deployed in real DVOT-shaped space.
Figure 21B:
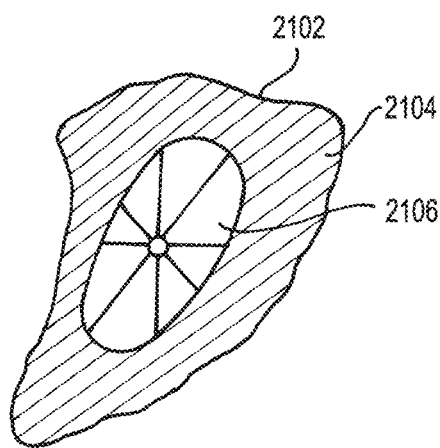

FIGS. 21A and 21B show superior views (cross-sections) of a deployed catheter 2000 in real RVOT-shaped space. Element 2102 represents the digitized anatomy of inferior (FIG. 21A) and superior (FIG. 21B) aspects of an RVOT. Element 2104 represents part of the RVOT lumen which will be obstructed by the device when deployed, and element 2106 represents an open lumen, which is not obstructed by the device.

Figure 22:
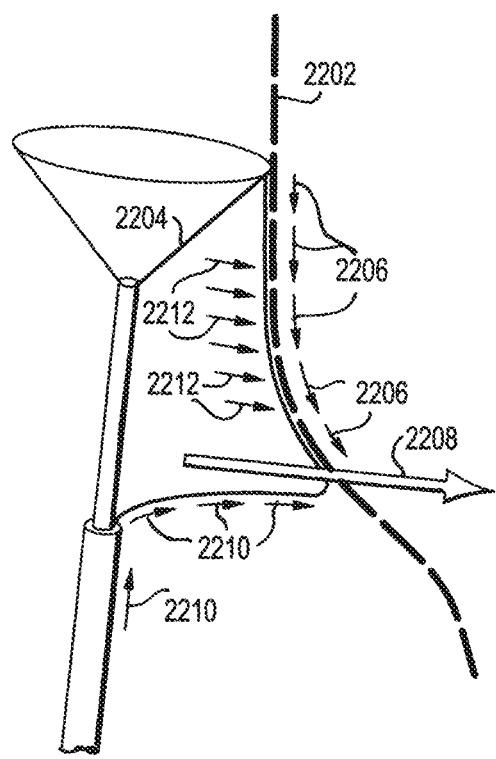
FIG. 22 is a drawing showing a multifunction catheter of the present invention deployed in the heart.

FIG. 21 shows the deployment of the inflated balloon catheter 2000 in a heart. The catheter 2000 is shown in situ or cross-section in a plane perpendicular to the plane of the pulmonary valve PV. FIG. 22 shows the principle of shaping or wall fitting of the inflated balloon catheter 2000. Element 2202 shows a cross-section of the RVOT inner wall. Element 2204 shows superior part of the deployed catheter which diameter is adjusted to the corresponding superior part of the RVOT 2206. Element 2210 represents the inferior part of the deployed catheter, which comes in contact with the RVOT wall at element 2208. FIG. 23. Shows a basic Mechanical Model of an RVOT catheter illustrated in FIGS. 19 and 20.

FIG. 24 shows a simplified depiction of an alternative embodiment of RVOT catheter structure. FIG. 24A shows a schematic of a basic undeployed model of RVOT apparatus; FIG. 24B shows the flexible part; FIG. 24C shows a joint close-up; and FIG. 24D shows a top view. As shown, the catheter structure can include a rod (FIG. 24A) with an expandable or flexible part (FIG. 24B) at a distal end of the rod, and a support ring. The flexible part can be formed for example, by a series of expandable arms having one end coupled to and positioned concentrically about the distal end of the rod, and an opposite end coupled to the support ring. Each arm has one or more arm portions connected together by a joint, here shown as a spherical-shaped ball with a slot or the like. Each arm portion can be rotatably connected to a joint (such as having a wide head that is received by a hollow ball) to form a chainlike structure with alternating joint and arm portions and a joint coupled at the ends to the rod and support ring, as shown in FIGS. 24C, D. The arms can have any suitable shape, such as elongated with a circular or square cross-section. Multiple arms are provided concentrically about the rod and support ring. A control member can slidably connect the rod to the support ring. For instance, a control rod can be slidably received in a central opening of the rod and coupled to the support ring. As the support ring is drawn closer to the distal end of the rod, the arms of the flexible part expand outward. As the support ring is moved away from the distal end of the rod, the arms contract inward and are substantially linear in the full inward position, as shown in FIG. 24B. A catheter or the like incorporating the chipset network of the present invention, can then be placed over the flexible part in the contracted position and placed in position in the patient then expanded to secure it within the patient.

Advantages of the Invention in Comparison with the Prior Art

The invention disclosed herein has many advantages over prior art devices. They are:

1. Big arteries and outflow tract use is allowed by hollow inside sleeve design.
2. The invention can be combined with one beat fast mapping function with ablation ability.
3. A very high number (thousands) and density of sensors/actuators can be achieved with this solution compared with other approaches—baskets or arrays with tens of poles.
4. Different types of electronic elements can be placed on the sleeve surface.
5. Patients will be less stressed because of several reasons:
   Significant reduction of EP study time will be achieved with this approach;
   Reduction of mapping time of whole RVOT status up to acquisition of a single clinical PVC;
   No need to introduce more catheters;
   Significant reduction of fluoroscopy—single catheter use, no repositioning during mapping and/or ablation process;
   Significant reduce of anesthesia time; and
   Reduction in procedure expenses (staff working time)

In achieving these advantages, the invention disclosed herein enables enables a new line of catheters comprising a high resolution, flexible, stretchable electrode array that is capable of measuring not only electrical signals, but also other pieces of diagnostic information (e.g., mechanical, metabolic etc.). It also allows for a more sophisticated line of catheters that not only acquires diagnostic information as mentioned above, but also makes it possible to use the same catheter to deliver treatment (e.g., electrotherapy) to restore normal heart function. Finally this invention will create an entirely new line of products that are distinct from existing catheter-based products and are targeted as an implantable device. This would allow for real time diagnosis and treatment of cardiac arrhythmias. This invention could enable new catheter-based products in the market that can acquire electrical signals (e.g., electrograms), mechanical information (e.g., strain measurements), metabolic data (e.g., ion concentration) and miscellaneous (e.g., temperature, pressure etc.,) information with high resolution that is currently not possible with existing technologies. The invention would enable new implantable medical devices that allow for real time diagnosis and treatment of cardiac arrhythmias in a manner that is painless (as it uses tens of orders of magnitude less shock energy compared to current ICD products) and consequently significantly improve the quality of life of the patient.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A cardiac tissue mapping system for introducing to heart tissue of a heart formed by a wall and having a passage leading thereto, comprising:
   a catheter probe having a distal end; and
   said distal end comprising a flexible and stretchable circuit formed as a single unitary chiplet structure, said circuit embedded with:
      a first electrode array forming a first electrode layer having a plurality of stimulation-only electrodes configured to deliver an electrical stimulation signal to the heart tissue;
      a second electrode array forming a second electrode layer coupled to the first electrode layer, said second electrode layer having one or more ablation-only actuators different from said plurality of stimulation-only electrodes, wherein said ablation-only actuators are configured to deliver an ablation signal to the heart tissue;
      the first electrode array further including one or more arrhythmia-only sensors different from said plurality of stimulation-only electrodes and one or more arrhythmia-only sensors;
      wherein said one or more arrhythmia-only sensors deliver an arrhythmic pacing energy to detect electrical, mechanical, impedance, and metabolic characteristics of the heart tissue and verify that the Atrioventricular Nodal Reentrant Tachycardia (AYNRT) pathway has been sufficiently ablated; and
      a third electrode array forming a third electrode layer coupled to the first and second electrode layers and having a plurality of temperature and pressure sensor electrodes different from said stimulation-only sensors, said ablation-only actuators, and said arrhythmia-only sensors, wherein said plurality of temperature and pressure sensor electrodes detect temperature and pressure;
   wherein said first and second electrode arrays are formed in rows and columns that are evenly-spaced apart, aligned with and parallel to each other, and whereby the second electrode array overlays the first electrode array and the third electrode array overlays the second electrode array;
   wherein said circuit further comprises a processor configured to map the wall of cardiac tissue, wherein said processor detects arrhythmia severity in the cardiac tissue only via the one or more arrhythmia-only sensors, simultaneously performs real-time ablation therapy only via the one or more ablation-only actuators having a duration and force based on the detected arrhythmia severity in the cardiac tissue and the detected temperature and pressure from said plurality of temperature and pressure sensor electrodes, and simultaneously delivers in real-time only via said plurality of stimulation-only electrodes the electrical stimulation signal to provide localized stimulation therapy based on the detected arrhythmia severity and restore normal heart function.

2. The cardiac tissue mapping system of claim 1, wherein the flexible and stretchable circuit is formed from a biocompatible polymer membrane which conforms to a tissue surface being mapped.

3. The cardiac mapping system of claim 2, wherein said biocompatible polymer membrane is stretchable and monitors electrical activity on both an anterior and posterior surface of a heart.

4. The cardiac tissue mapping system of claim 1, wherein the mechanical characteristics comprise strain measurements and said arrhythmia-only sensors comprise strain sensors that measure strain of the heart tissue.

5. The cardiac tissue mapping system of claim 1, wherein the electrical impedance characteristics comprise resistance and said arrhythmia-only sensors at said distal end of said catheter probe detect resistance of the heart tissue.

6. The cardiac tissue mapping system of claim 1, wherein the metabolic characteristics comprise pH measurements and said arrhythmia-only sensors detect the pH of the heart tissue.

7. The cardiac tissue mapping system of claim 1, wherein the electrical characteristics comprise electrograms and said arrhythmia-only sensors at said distal end of said catheter probe detect electrograms of the heart tissue.

8. The cardiac tissue mapping system of claim 7, wherein said electrical characteristics include at least one of threshold of excitation, functional and effective refractory period, conduction velocity, and wavelength and restitution properties of the foregoing characteristics.

9. The cardiac tissue mapping system of claim 7, wherein said sensors comprise an array of at least one of pH sensors and at least one of potassium ion sensors to provide an indication of metabolic state of said cardiac tissue underlying said sensors.

10. The cardiac tissue mapping system of claim 9, where said catheter probe is implantable in said heart to deliver therapy or gather sensor data.

11. The cardiac tissue mapping system of claim 10, wherein said system further comprises a wireless communication device for sending and receiving information or for being programmed by a device outside a patient.

12. The cardiac tissue mapping system of claim 11, wherein said system further comprises a plurality of wireless communication devices configured for local coordination of data gathering, computations analysis and subsequent delivery from on-board actuators.

13. The cardiac tissue mapping system of claim 7, wherein said sensors comprise an array of at least one of pH sensors and at least one of potassium ion sensors, and wherein said temperature sensors are configured to monitor a spatial and temporal distribution of temperature.

14. The cardiac tissue mapping system of claim 1, wherein said flexible and stretchable circuit comprises a plurality of optical sources.

15. The cardiac tissue mapping system of claim 1, wherein the distal end of said catheter probe comprises a tip extending distally from said catheter for physically anchoring said catheter probe into an orifice of the heart.

16. The cardiac tissue mapping system of claim 15, wherein said orifice comprises one of a coronary sinus, right ventricular outflow tracts, pulmonary veins and superior and inferior vena cava.

17. The cardiac tissue mapping system of claim 1, wherein said flexible and stretchable circuit is formed in at least one preconfigured strip for conforming to the tissue being mapped.

18. The cardiac tissue mapping system of claim 1, wherein said catheter probe can be utilized for any type of tissue in said heart.

19. The cardiac tissue mapping system of claim 1, wherein the plurality of electrodes deliver electrical energy to said cardiac tissue to provide the localized stimulation therapy to said cardiac tissue and heating said cardiac tissue.

20. The cardiac tissue mapping system of claim 1, wherein said system is programmable to provide therapy if a set of sensor parameters is detected.

21. The cardiac tissue mapping system of claim 1, wherein said system is configured to achieve high resolution mapping of the wall of the cardiac tissue with a resolution from about 300 micrometers to about 5 millimeters.

22. The cardiac tissue mapping system of claim 1, wherein said chiplet structure comprises a substrate layer, a transistor layer formed over said substrate layer, and a silicon dioxide outer layer formed over said transistor layer and configured to capacitively couple the heart tissue with said transistor layer and form a fluid barrier layer.

\* \* \* \* \*